United States Patent
Priddle et al.

(10) Patent No.: US 8,768,984 B2
(45) Date of Patent: Jul. 1, 2014

(54) MEDIA CONTAINER FILE MANAGEMENT

(75) Inventors: Clinton Priddle, Upplands Väsby (SE); Per Fröjdh, Stockholm (SE); Andrey Norkin, Solna (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 0 days.

(21) Appl. No.: 13/258,741

(22) PCT Filed: Nov. 6, 2009

(86) PCT No.: PCT/SE2009/051260
§ 371 (c)(1),
(2), (4) Date: Sep. 22, 2011

(87) PCT Pub. No.: WO2010/117315
PCT Pub. Date: Oct. 14, 2010

(65) Prior Publication Data
US 2012/0016917 A1    Jan. 19, 2012

Related U.S. Application Data

(60) Provisional application No. 61/167,998, filed on Apr. 9, 4009.

(51) Int. Cl.
*G06F 17/30* (2006.01)

(52) U.S. Cl.
USPC ........... 707/827; 707/736; 707/758; 707/821; 709/217; 709/230; 348/180; 375/240

(58) Field of Classification Search
None
See application file for complete search history.

(56) References Cited

U.S. PATENT DOCUMENTS 8,275,051 B2 * 9/2012 Hannuksela et al. .... 375/240.27
8,355,448 B2 * 1/2013 Hannuksela et al. .... 375/240.24

(Continued)

FOREIGN PATENT DOCUMENTS

WO    WO 2007/078252 A2    7/2007

OTHER PUBLICATIONS

ISO/IEC 14496-10: Information Technology—Coding of audio-visual objects—Part 10: Advanced Video Coding (Reference No. ISO/IEC FDIS 14496-10:200X(E); International Organization for Standardization, Geneva, Switzerland, 2009.

(Continued)

*Primary Examiner* — Hung Le
(74) *Attorney, Agent, or Firm* — Myers Bigel Sibley & Sajovec, P.A.

(57) ABSTRACT

A media container file (1) is generated by organizing media data (2; 3) defined by a media track (12) in the file (1). Sub-track information (72, 74) identifying media data portions (4, 5; 6, 7, 8) of the media data (2; 3) is organized for each sub-track of multiple sub-tracks defined in the media track (12). At least one of the sub-tracks is assigned selection information (62, 64) defining a selective processing of the media data portion (4, 5; 6, 7, 8) defined by the sub-track in relation to other media data organized in the media container file (1). The media data (2, 3) advantageously relate to layered media or media defining multiple camera views which are organized into sub-tracks (12). The selection information (62, 64) allows selection among tracks (12) and sub-tracks when setting up a media session and switching between tracks (12) and sub-tracks during such a media session.

23 Claims, 7 Drawing Sheets

(56) References Cited

U.S. PATENT DOCUMENTS

| | | | |
|---|---|---|---|
| 8,365,060 B2* | 1/2013 | Wang et al. | 715/202 |
| 8,594,203 B2* | 11/2013 | Ugur et al. | 375/240.25 |
| 2003/0123546 A1* | 7/2003 | Falik et al. | 375/240.12 |
| 2003/0163781 A1* | 8/2003 | Visharam et al. | 715/500 |
| 2005/0117641 A1* | 6/2005 | Xu et al. | 375/240.08 |
| 2005/0275752 A1* | 12/2005 | Li et al. | 348/398.1 |
| 2006/0150053 A1* | 7/2006 | van der Schaar et al. | 714/752 |
| 2006/0233247 A1 | 10/2006 | Visharam et al. | |
| 2006/0251167 A1* | 11/2006 | Van Der Schaar et al. | 375/240.02 |
| 2007/0110150 A1 | 5/2007 | Wang et al. | |
| 2007/0121722 A1 | 5/2007 | Martinian et al. | |
| 2008/0052306 A1* | 2/2008 | Wang et al. | 707/101 |
| 2008/0260047 A1* | 10/2008 | Hannuksela et al. | 375/240.27 |
| 2009/0003439 A1* | 1/2009 | Wang et al. | 375/240.08 |
| 2009/0185619 A1* | 7/2009 | Taleb et al. | 375/240.02 |
| 2010/0002761 A1* | 1/2010 | Pandit et al. | 375/240.01 |
| 2010/0153395 A1* | 6/2010 | Hannuksela et al. | 707/737 |
| 2010/0195738 A1* | 8/2010 | Zhu et al. | 375/240.25 |
| 2011/0064146 A1* | 3/2011 | Chen et al. | 375/240.26 |
| 2013/0121413 A1* | 5/2013 | Hannuksela et al. | 375/240.12 |

OTHER PUBLICATIONS

ISO/IEC 14496-12: Information Technology—Coding of audio-visual objects—Part 12: ISO base media file format, Third Edition (Reference No. ISO/IEC 14496-12:2008(E); International Organization for Standardization, Geneva, Switzerland, Oct. 15, 2008.

ISO/IEC FDIS 14496-15: Information Technology—Coding of audio-visual objects—Part 15: Advanced Video Coding (AVC) file format (Reference No. ISO/IEC FDIS 14496-15:2004(E); International Organization for Standardization, Geneva, Switzerland, 2004.

ISO/IEC JTC 1/SC 29—ISO/IEC 14496-15:2004/FDAM 2:2008(E): Information Technology—Coding of audio-visual objects—Part 15: Advanced Video Coding (AVC) file format, Amendment 2: File format support for Scalable Video Coding, STD Version 2.1c2; International Organization for Standardization, Geneva, Switzerland, Mar. 10, 2008.

ISO/IEC JTC 1/SC 29 / ISO/IEC 14496-15:2004/FDAM 3:2009(E): Information Technology—Coding of audio-visual objects—Part 15: Advanced Video Coding (AVC) file format, Amendment 3: File format support for Multiview Video Coding, STD Version 2.1c2, International Organization for Standardization, Geneva, Switzerland, Sep. 1, 2009.

International Search Report, PCT Application No. PCT/SE2009/051260, Jun. 29, 2010.

Written Opinion of the International Searching Authority, PCT Application No. PCT/SE2009/051260, Jun. 29, 2010.

Amon et al., "File Format for Scalable Video Coding", *IEEE Transactions on Circuits and Systems for Video Technology*, vol. 17, No. 9, Sep. 2007, pp. 1174-1185.

Supplementary European Search Report, Application No. 09843130.7, Jul. 26, 2012.

ISO/IEC, "ISO/IEC 15444-12:2005, Information technology—JPEG 2000 image coding system—Part 12: ISO base media file format", Oct. 29, 2008, 94 pp., XP02501713, retrieved from the Internet: URL:http://standards.iso.org/ittf/PubliclyAvalableStandards/c041827_ISO_IEC_15444-12_2005(E).zip.

Translation of Russian Office Action, Application No. 2011145299/08(067849); filed Nov. 6, 2009, 6 pages.

* cited by examiner

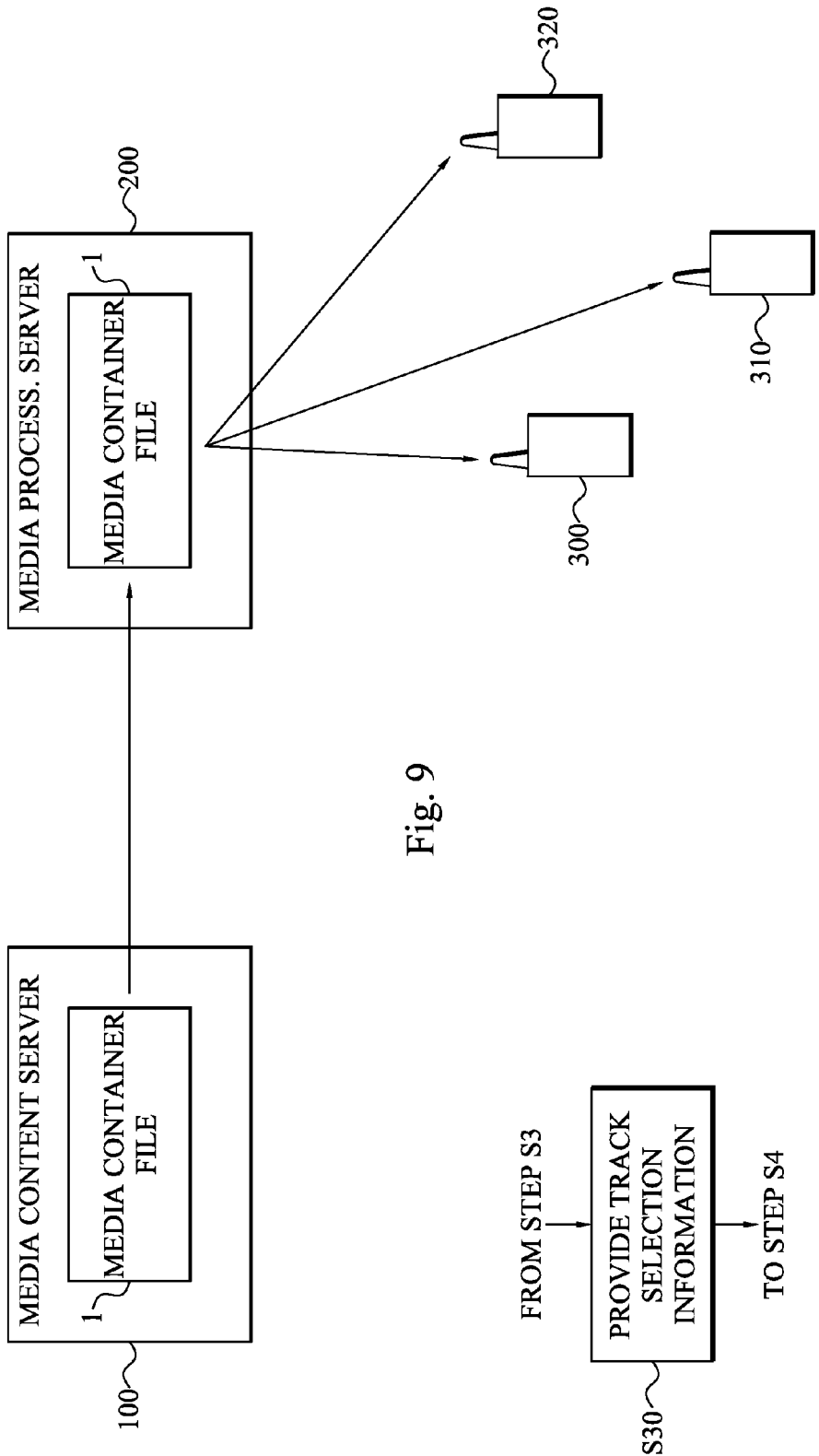

MEDIA CONTAINER FILE MANAGEMENT

CROSS REFERENCE TO RELATED APPLICATIONS

This application is a 35 U.S.C. §371 national stage application of PCT International Application No. PCT/SE2009/051260, filed on 6 Nov. 2009, which itself claims priority to U.S. provisional Patent Application No. 61/167,998, filed 9 Apr. 2009, the disclosure and content of both of which are incorporated by reference herein in their entirety.

TECHNICAL FIELD

The present invention generally relates to media and multimedia management, and in particular to creation and usage of media container files containing such media or multimedia content.

BACKGROUND

Media and multimedia provision to clients over different networks have increased tremendously the last few years. Today, Internet is employed by numerous users for accessing and downloading or streaming media, e.g. in the form of video and audio streams or files, from media servers.

In line with this increasing demand for media provision in different wired and wireless communications networks, there is on-going work in the development of streaming and downloading servers available in wireless networks for providing media content to requesting clients. There is a general trend towards transparent and flexible streaming/downloading servers, implying that the servers should basically consist of a multitude of "standard" modules or programmes performing different media managing functions. The input media content to these functions is then provided together with instructions of how the modules/programmes should process the content. This will provide a more flexible media provision as compared to usage of fixed, pre-defined media processing in the servers.

The Moving Picture Experts Group (MPEG) has standardized a file format, the ISO base media file format [1], that is in line with the trend in the development of streaming and downloading servers. The ISO base media file format specifies a general file format for storage and transmission of multimedia presentations that serves as a base to a number of more specific file format, such as the Advanced Video Coding (AVC) file format [2], the Scalable Video Coding (SVC) file format [3] and the Multiview Video Coding (MVC) file format [4].

The ISO base media file format can group tracks into alternate groups. Tracks that belong to the same alternate group are called alternate tracks and serve as alternatives to one another. They can, for example represent the same content but differ with respect to quality, codec, language, etc. Only one track from each alternate group should be processed at a time in a media session in order to give a complete presentation.

In addition to alternate groups, the ISO base media file format also defines switch groups. All tracks in an alternate group are candidates for media selection, but it may not make sense to switch during an ongoing media session between some of those tracks. For instance, it could be possible to switch between video tracks at different bitrates, while keeping the frame size but not allow switching between tracks of different frame sizes, different video codes or different audio languages. The distinction between the alternate groups and the switch groups is that the tracks in the same switch group are candidates for switching even during an ongoing media session while the tracks that are in the same alternate group but in different switch groups are not to be switched during the ongoing media session.

The prior art organization of media data in tracks and assigning such tracks to different alternate and switch groups work well with most media types. However, problems occur in connection with certain media types, for instance SVC and MVC [5].

SVC is a standardized scalable extension to the well established H.264/AVC video coding standard [5]. SVC allows encoding multiple representations of the video in a single bit stream. Each such coded representation of video at the particular spatial resolution, quality and frame rate is denoted as a layer. The layers constitute a hierarchical relationship, with the lowest layer denoted the base layer (BL) and the successive layers denoted as enhancement layers (ELs).

MVC is an extension of the AVC/SVC standard that targets joint encoding of multiple views. Multiple views are, in this context, video sequences representing the same scene that are taken with different cameras. The structure of MVC views is similar to the structure of SVC layers with the difference that MVC views usually have similar resolution, quality and frame rate.

SUMMARY

When applying the ISO base media file format to SVC or MVC encoded content, each track will contain multiple versions of the same content in forms of multiple layers or views. The alternate groups and switching groups are however designed specifically for single track. This means that during an ongoing media session switching can take place between different layers or views defined by the track as these will inherently belong to the same alternate group and the same switch group. There are, though, situations where it is highly undesirable to switch dynamically between layers or views. For instance, the base layer may be free and contains adverts, while the enhancement layer contains a premium and paid advertisement-free version of the content. It is therefore undesirable to unintentionally switch from the premium content to the free content for a user that has paid to avoid adverts.

There is, thus, a need for a solution of applying the concept of alternate and/or switch groups to media types that carry multiple versions of the same content, such as SVC and MVC.

It is a general objective to provide a media container file that can be used in media sessions.

It is a particular objective to provide such a media container file that can be used for media data comprising multiple media data portions constituting respective sub-streams.

These and other objects are met by embodiments as disclosed herein.

Briefly, a media container file is generated by organizing media data defined by a media track in the media container file. The media data comprises portions that constitute different sub-streams in terms of relating to different versions of the same media content. For instance, the media data portions can relate to different layers of SVC data or different views of MVC data.

Sub-track information is provided in the media container file for each sub-track defined by the media track. The sub-track information identifies the media data portion in the media container file that belongs to or is defined by the sub-track. At least one of the sub-tracks is assigned selection information, which is included in the media container file.

The selection information defines a selective processing of the media data portion defined by the sub-track in relation to other media data organized in the media container file and relating to the same content as the media data portion of the sub-track.

An aspect also relates to a media content server designed for generating such a media container file. The media content server comprises a data organizer for organizing the media data in the media container file. A sub-track information provider provides the sub-track information in the media container file and a selection information provider provides the selection information in the media container file.

Another aspect defines the media container file comprising media data portions constituting respective sub-streams. A media tracks is included in the media container file for defining the media data. The media container file additionally comprises sub-track information identifying, for each sub-track defined in the media track, the media data portion of the media data that belongs to the sub-track. Selection information is comprised in the media container file for at least one sub-track to define a selective processing of the media data portion associated with the sub-track in relation to other media data organized in the media container file and relating to the same media content as the media data portion.

A media processing method according to an aspect uses the media container file by selecting, based on an alternate group identifier assigned to a sub-track as selection information, the sub-track in connection with setting up a media session. Media data associated with the selected sub-track is retrieved from the media container file based on the sub-track information assigned to the selected sub-track. The retrieved media data is compiled into data packets and transmitted to at least one user terminal during the media session.

Another aspect of a media processing method switches from a current track or sub-track to another sub-track during an ongoing media session. The switching is performed based on a switch group identifier assigned to the sub-track as selection information and is therefore present in the media container file. Sub-track information assigned to the selected sub-track and included in the media container file is used to retrieve media data of the sub-track and compile it into data packets that are sent to at least one user terminal to affect a switch of media data relating to the same content during the ongoing media session.

A media processing server comprises, according to an aspect, a container provider for providing a media container file. A track selector selects a sub-track defined in the media container file in connection with setting up a media session. The track selector uses an alternate group identifier from the media container file and assigned to the sub-track in the selection procedure. A packet compiler retrieves media data of the sub-track from the media container file and compiles the media data into data packets based on the sub-track information associated with the sub-track. A transmitter transmits the data packets to at least one user terminal during the media session.

Another aspect of a media processing server achieves switching between streams and sub-streams relating to the same media content during an ongoing media session. A container provider provides a media container file in which at least one sub-track is defined and comprises associated switch group identifier and sub-track information. A track selector uses the switch group identifier to select a sub-track relating to the same media content as a current track or sub-track. A packet compiler compiles data packets carrying media data of the selected sub-track based on the sub-track information. The data packets are transmitted to at least one user terminal during the ongoing media session to affect a switch of media data stream or sub-stream.

BRIEF DESCRIPTION OF THE DRAWINGS

The invention, together with further objects and advantages thereof, may best be understood by making reference to the following description taken together with the accompanying drawings, in which:

FIG. 3 is a flow diagram illustrating an embodiment of the information providing steps in FIG. 1 applicable for scalable video coding data;

FIG. 6 is a flow diagram illustrating an embodiment of the information providing steps in FIG. 1 applicable for multiview video coding data;

FIG. 7 is a flow diagram illustrating an additional step of the generating method in FIG. 1 according to an embodiment;

FIG. 9 is an overview of a communication network including servers generating and using media container files according to an embodiment;

DETAILED DESCRIPTION

Throughout the drawings, the same reference numbers are used for similar or corresponding elements.

The present invention generally relates to media and multimedia data management and in particular to creation and utilization of media container files in connection with media servers, such as streaming or downloading servers, in a communication network, including a radio-based communication network. The media container file comprises, in addition to the media content to transmit to requesting client(s), instructions used for performing media processing and transmission in the media servers. These instructions include selection information that can be used by the media servers for the purpose of selecting media content in connection with a media session, such as selecting media content when setting up the media session and/or switching between media data streams during the ongoing media session.

According to the current invention, media or multimedia data or content refers to any data that can be provided by a content provider or server to a client for rendering of the data. Typical preferred examples include video data and audio data. The embodiments are in particular useful in connection with media data comprising multiple different data portions, where each such data portion constitute a respective sub-stream. Such media data is organized into a single media track of the media container file but comprises multiple data portions, such as layers in SVC or views in MVC. The organization of media data into sub-stream-specific media data portions leads to problems when applying the prior art techniques, i.e. the. alternative group and switch group identifiers of the prior art. In order to more clearly disclose the advantages of the embodiments, a short discussion of the limitations in the prior art techniques first follow.

SVC Content Classes

SVC allows encoding multiple representations of video content in a single bit stream. Scalability of the video data can be achieved in terms of:

temporal scalability—The frame rate can be decreased by dropping frames.

spatial scalability—Layers are encoded at different spatial resolutions. Prediction of higher resolutions can use the data of lower resolution.

quality scalability—Layers are encoded at the same spatial resolution but are encoded with different quality. Quality scalability is also denoted signal-to-noise ration (SNR) scalability in the art.

Figure 2:
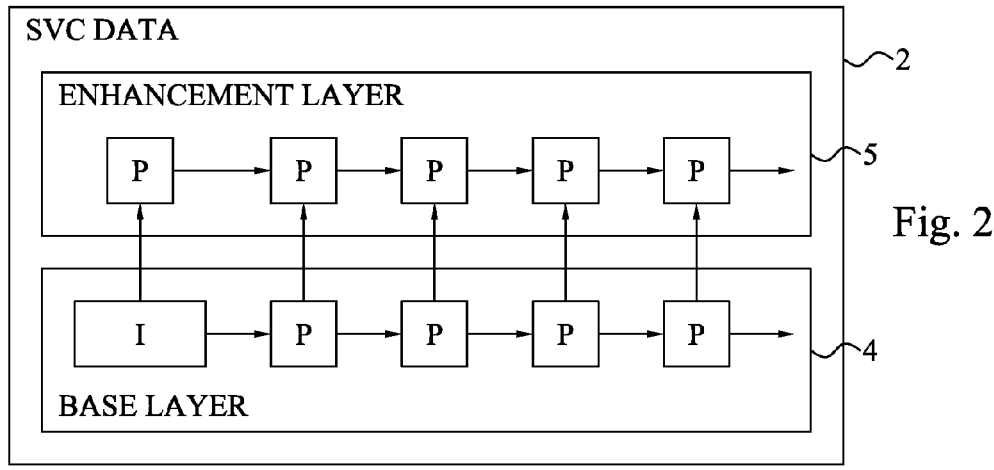
FIG. 2 is a schematic illustration of organization of scalable video coding data into different layers.

The encoded data 2 is divided into different layers 4, 5, which is schematically illustrated in FIG. 2. The layers 4, 5 constitute a hierarchical relationship, with the lowest layer denoted the base layer 4 and the successive layers denoted as enhancement layers 5. The figure schematically illustrates this hierarchical coding relationships between the layers 4, 5 in terms of that the (inter or P) frames of the enhancement layer 5 are encoded based at least partly on the (intra or I/intra or P) frames of the base layer 4.

SVC can be used to represent different versions or classes of the same video content, for instance, a paid premium version versus a free version. The difference between the two versions can be in terms of quality, e.g. high versus low fidelity, resolution, e.g. high definition (HD) versus standard definition (SD) or 1080 p versus 720 p, advertising, e.g. absence versus presence of spatial insertions of advertisements and logos, etc.

The two content classes can be encoded by one SVC track with the free version in the base layer (BL) and the premium version in the enhancement layer (EL). However, the switch group syntax of the prior art cannot be used for assigning different switch groups within a track:

| Content | Layer | Track ID | Alternate group | Switch group |
|---|---|---|---|---|
| SVC free | BL | 1 | 1 | ? |
| SVC premium | EL | | | |

There is consequently no possibility of preventing, according to the prior art, unintentional switching between the free version and the premium version. This is of course not acceptable to the user having paid extra to avoid having advertisements in the video.

MVC Views

Figure 4:
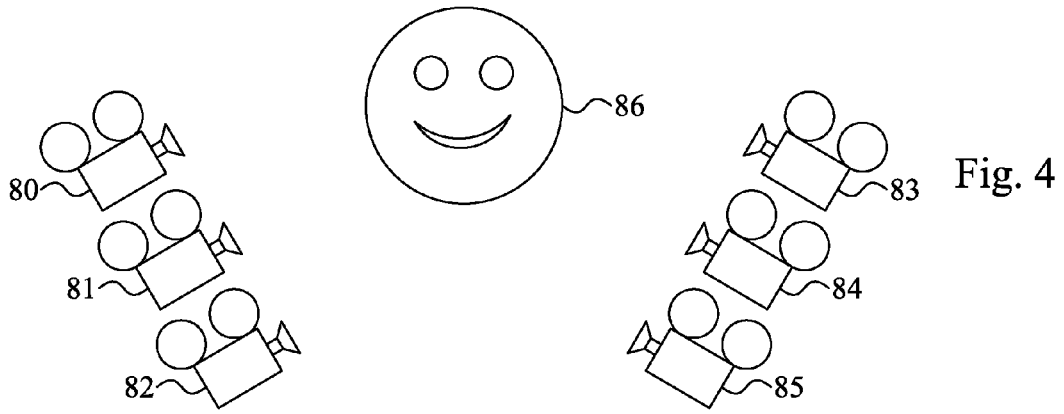
FIG. 4 schematically illustrates recording a scene using multiple camera views.
Figure 5:
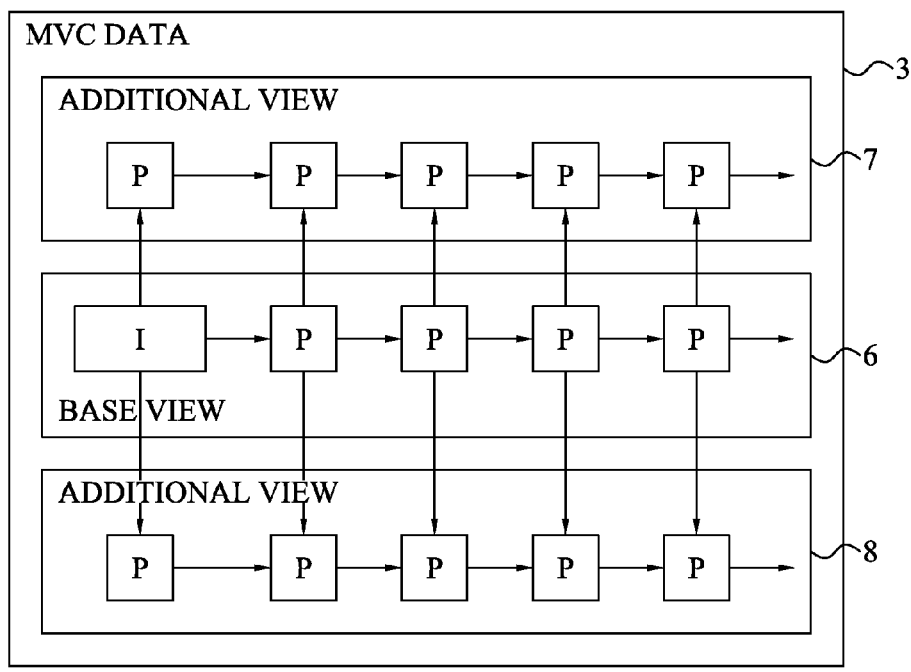
FIG. 5 is a schematic illustration of organization of multi-view video coding data into different views.

MVC jointly encodes video data captured from multiple camera views 80-85 of a scene 86 as is illustrated in FIG. 4. The figure illustrates three cameras 80-82 capturing different left views of the scene 86, whereas three other cameras 83-85 are positioned to capture different right scene views. Inter-view correlations can be utilized in a joint encoding of the multiple views to thereby reduce the bit rate as compared to individually encoding the different views. FIG. 5 illustrates the concept of MVC data 3 organized into different views 6-8. In such a case, one of the views is a base view 6, whereas other views, denoted additional views 7, 8, are encoded relative the base view 6 or other additional views as schematically illustrated in the figure.

MVC data imposes problems to the prior art in similar ways to SVC data. For instance, assume a case where video data from one left view and right view pair is encoded with H.263 and another left and right pair is encoded as MVC data:

| Content | View | Track ID | Alternate group | Switch group |
|---|---|---|---|---|
| H.263 left view | | 1 | 1 | 1 |
| H.263 right view | | 2 | 2 | 2 |
| MVC left view | 1 | 3 | ? | ? |
| MVC right view | 2 | | | |

It is not according to the prior art possible to indicate alternatives between the two left encodings or between the two right encodings since alternate and switch group identifiers are assigned on track level. In this case, the track 3 should actually belong to both the same alternate group as H.263 left view and the same alternate group as H.263 right group as the track contains both left and right view video data.

One might at first glance try to solve these prior art problems by using extractors. Extractors reference other data within the same media container file. When an extractor is processed by a file reader, it is replaced by the media data it refers to.

One Track for the SVC Stream

| Content | Track ID | Alternate group | Switch group |
|---|---|---|---|
| SVC BL + EL | 1 | 1 | 1 |

The above identified problems exist in this case since switching may occur between the base layer and the enhancement layer during a media session.

One Track for the SVC Stream—Extract BL into Different Track

| Content | Track ID | Alternate group | Switch group |
|---|---|---|---|
| SVC BL + EL | 1 | 1 | 1 |
| SVC BL (extractors from track 1) | 2 | 1 | 2 |

Even with different switch groups for the two tracks, it is possible to switch between the base layer and the enhancement layer in track 1.

One Track for the AVC Stream—Extract BL into Different Track

| Content | Track ID | Alternate group | Switch group |
|---|---|---|---|
| SVC BL (AVC) | 1 | 1 | 1 |
| SVC BL (extractors from track 1) + SVC EL | 2 | 1 | 2 |

Even with different switch groups for the two tracks, it is possible to switch between the base layer and the enhancement layer in track 2.

Thus, none of the above-presented obvious modifications to the prior art solution will solve the problem of controlling the switching, for instance preventing switching, between the base and enhancement layers.

Today a specific solution for SVC actually exists that can prevent switching to the base layer. The layer_output_flag in the scalability information supplementary enhancement indicator (SEI) message is a candidate. layer_output_flag equal to 1 indicates that the decoding result for the current scalable layer representation is intended for output. layer_output_flag equal to 0 indicates that the decoding result for the current scalable layer representation is not intended for output.

However, setting the layer_output_flag to 0 for the base layer only works if the base layer is never intended for output. The whole point with having different content classes or versions is that all classes should be potential candidates for output. After selecting one of them, the switching between them should though be controllable, such as restricted. Thus, usage of layer_output_flag in this way will not solve the problem of the prior art since it will actually restrict accessibility to one of the layers, thereby loosing the advantage of having different layers and media content classes. Additionally, the layer_output_flag is not available in the file format of the ISO base media file format but instead requires an on-the-fly inspection of the actual bit stream, which is cumbersome during a media session.

Thus, there is a need of a solution that allows usage of alternate and switch groups also for media content types organized into different sub-streams as, for instance SVC and MVC data, since the prior art techniques cannot be used to achieve such a solution.

Figure 1:
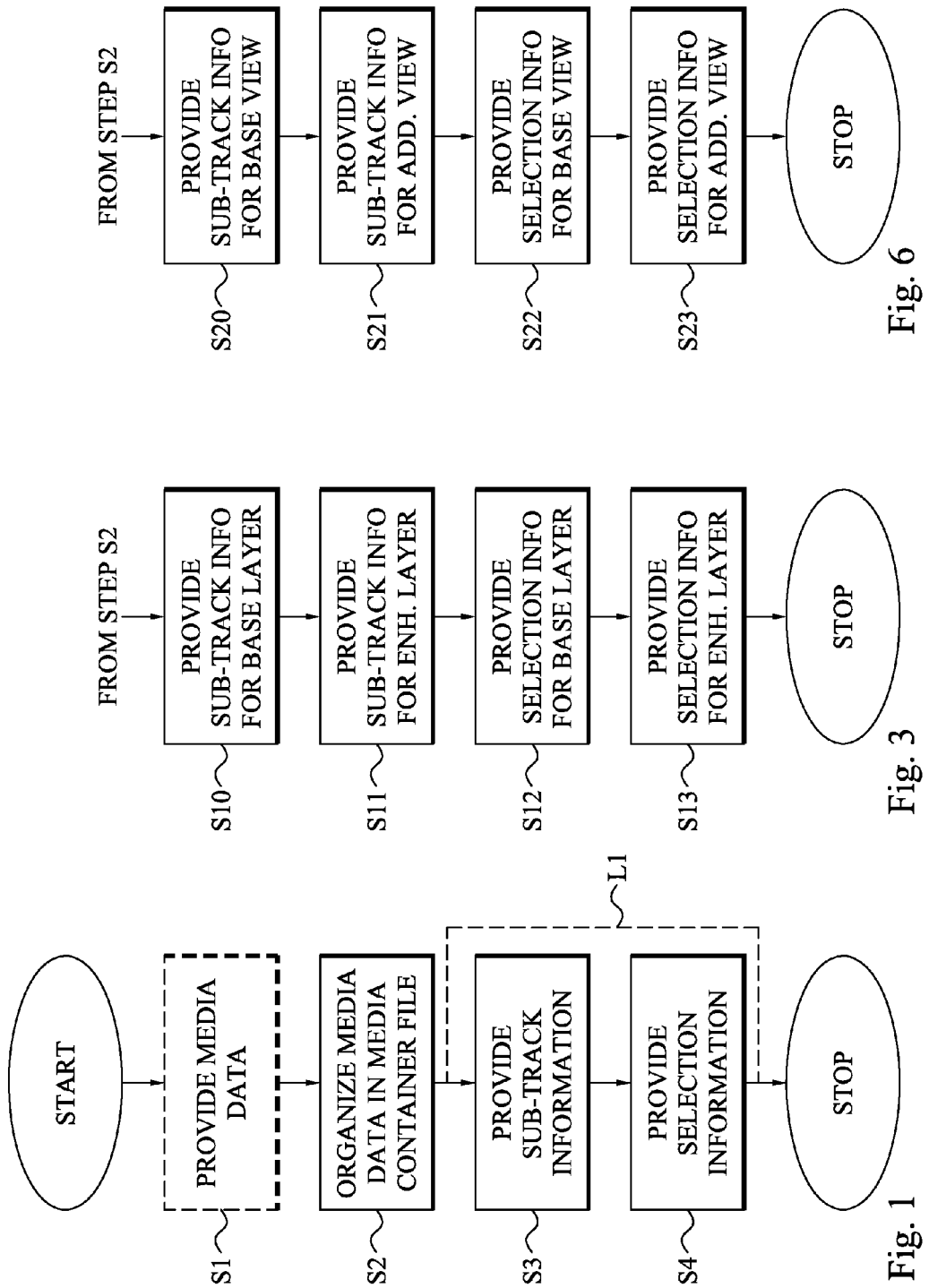
FIG. 1 is a flow diagram illustrating a method of generating a media container file according to an embodiment.

FIG. 1 is a flow diagram of a method of generating a media container file according to an embodiment. This media container file can be regarded as a complete input package that can be used by a media server during a media session for providing media content and forming media data into transmittable data packets. Thus, the media container file preferably comprises, in addition to the media content per se, information and instructions required by the media server for performing the processing and allowing transmission of the media content during a media session.

The method starts in the optional step S1, where the media data to be included in the media container file is provided. According to the embodiments, the media data comprises multiple, i.e. at least two, data portions constituting respective sub-streams of the media content. These multiple media data portions can be regarded as constituting different versions of the same media content. For instance, layered media, such as SVC, includes multiple layers, typically in a hierarchical order. Processing only one layer, i.e. the base layer, or additionally processing an enhancement layer most often generates the same media content but in different classes or versions, for instance in terms of quality, resolution, etc. However, the actual media content that is provided when processing the alternative layers is generally the same although it might be in the form of different versions. A similar situation occurs for MVC where the media data portions relate to different camera views. Although SVC and MVC are preferred examples of media data that can be provided in step S1, the embodiments are not limited thereto. In clear contrast, any other type of media data that can be organized into different media data portions, such as layers or views, including scalable audio data can be used.

It is anticipated by the invention that even though one layer or view may be regarded as one media data portion it might, due to encoding inter-relationships, need encoded data from another layer or view to be decodable. For instance, enhancement layers may be encoded in relation to the base layer and/or other enhancement layer(s) and additional views may be encoded in relation to the base view and/or other additional layer(s). Thus, processing a layer or view in terms of providing a decodable stream of data packets may require data from other layers or views.

The provision of the media data in step S1 may be implemented according to various embodiments. The media data can have been generated or collected by some other server or device in a communication system and transmitted to the media content server performing the generation of the media container file. Alternatively, the media content server may itself include media recording or generating equipment that provides the media data to be included in the media container file.

A next step S2 organizes the media data provided in step S1 in the media container file so that the media data is defined by a media track in the media container file.

The media data organized in the media container file in step S2 preferably collectively comprise all media content that is to be transmitted to a client during a media session. In other words, the media container file contains the media data for an entire multimedia presentation including all required layers or views. Thus, if the media content includes a music video, the media container file preferably comprises media data with the video data and media data with the corresponding audio data.

The media track in the media container file defines the media data with its multiple media data portions. This means that the media track comprises the information required for providing, during a media session, a presentation of the media content. Preferably, the media track carries its own temporal and spatial information and provides instructive information relating to the media data it refers to.

The media track comprises, according to the embodiments, multiple sub-tracks, preferably one such sub-track per each media data portion. Thus, the layered or view-based media data can then have one such sub-track per layer (or a group of layers) or camera view of the media content.

The next step S3 provides sub-track information in the media container file. This sub-track information identifies the media data portion that belongs to the particular sub-track. The information provision of step S3 and the next step S4 is preferably conducted once for each sub-track, which is schematically illustrated by the line L1.

Step S4 provides selection information in the media container file for at least one of the multiple sub-tracks. The selection information defines a selective processing of the media data portion defined by the sub-track in relation to other media data organized in the media container file. Thus, the selection information can be used by a media server in connection with a media session to select which sub-track and media portion to use when starting the media session and/or which sub-track and media portion that can or cannot be switched between during the media session. The selection information can be used similar to the alternate group identifier and/or switch group identifier according to the prior art. However, in clear contrast to the prior where the alternate/switch group identifier is assigned on a track basis meaning that one and the same alternate/switch group identifier is applicable to all the media data defined by the track, the selection information provided in step S4 only relates to a sub-track and the media data portion defined by the sub-track. As a consequence, other selection information can be assigned and used for the other media data portions that are all organized into a single media track.

The selective processing of the media data portion to which the selection information applies is preferably in relation to other media data relating to the same content as the media data portion. The other media data relating to the same content may be defined by the same media track, i.e. another sub-track in the media track, or another media track present in the media container file. In the former case, the other media data could be one or more other sub-tracks defined by the same media track and relating to other SVC layers or MVC views as compared to the SVC layer or MVC view of the current sub-track and media portion. In the latter case, the media container file contains at least two separate media tracks relating to the same content. For instance, one media track can include multiple sub-tracks defining SVC layers or MVC views, whereas the at least one other track can be encoded without any inter-view or inter-layer relationship, such as standard AVC (H.264) or H.263 data.

Respective selection information can be provided to each sub-track of the media track in step S4, which is schematically illustrated by the line L1. Alternatively, only one sub-track or a portion of the multiple sub-tracks is assigned selection information. The remaining sub-track(s) can then, as is further described herein, inherit the alternate and/or switch group identifier assignable to the complete media track defining the multiple sub-tracks.

The order of the steps S2 to S4 may be interchanged and can instead be conducted in any serial order or indeed at least partly in parallel.

The method then ends.

If the media container file contains multiple media tracks each consisting of multiple sub-tracks, the procedure of steps S1 to S4 can be conducted for each such media track.

The media container file generation described above in connection with FIG. 1 is preferably conducted at a media content creator or server having access to internal or external media content sources. The generated media container file may then be represented in a storage medium such as a computer memory, or in a physical signal such as an electrical signal or a radio signal, e.g. for transfer within a local system or for transmission over a local or global network. In a typical embodiment, the media container file is provided as a radio signal to a media server for usage in a media session with different clients.

In the following, the term media container file will be used throughout the disclosure with a meaning including both data files for storage in a storage medium and signals for transfer or distribution.

FIG. 3 is a flow diagram illustrating a particular embodiment of the information providing steps S3 and S4 applicable to SVC data as illustrated in FIG. 2. The method continues from step S2 of FIG. 1. A next step S10 provides sub-track information relating to the base layer 4 of the SVC data 2. This information defines the base layer sub-track to allow identification of the portion of the SVC data that the base layer sub-track relates to. A next step S11 correspondingly provides sub-track information for each enhancement layer 5 of the SVC data 2 in the media container file. The sub-track provided in step S11, thus, identifies the media data portion of the SVC data 2 that defines the particular enhancement layer 5 to which the sub-track relates.

The next two steps S12 and S13 provide selection information for the base layer and the enhancement layers. At least one of these steps S12 and S13 is conducted on the sub-track level. For instance, the base layer sub-track can be assigned dedicated selection information and the enhancement layer sub-track is correspondingly assigned dedicated selection information. Alternatively, one of the base layer sub-track and the enhancement layer sub-track is assigned sub-track specific selection information, while the other sub-track(s) inherits the selection information (alternate/switch group identifier) of the complete media track.

The order of the steps S10 to S13 may be interchanged and can instead be conducted in any serial order or indeed at least partly in parallel.

FIG. 6 is a corresponding particular implementation of the information providing steps S3 and S4 of FIG. 1 in the case of MVC data as illustrated in FIG. 5. The method continues from step S2 of FIG. 1. A next step S20 provides sub-track information defining the media data portion of the MVC data 3 that defines the base view 6. The next step S21 correspondingly provides sub-track information defining the media data portion(s) relating to the additional view(s) 7, 8 of the MVC data 3.

Selection information is assigned to the sub-tracks defining the base view and/or additional views in step S22 and S23. In similarity to steps S12 and S13 of FIG. 3, steps S22 and S23 can provide sub-track specific selection information to the sub-tracks defining the base view and the additional views or only provide such sub-track specific selection information to the base view or one or more of the additional view(s). In the latter case, sub-tracks that are not assigned sub-track specific selection information can inherit such information from the media track in which they are all defined.

The order of the steps S12 to S23 may be interchanged and can instead be conducted in any serial order or indeed at least partly in parallel.

The selection information that is assigned on sub-track basis according to the embodiments may advantageously be a sub-track specific alternate group identifier. Such alternate group identifier is then applicable by a media server in connection with setting up a media session when selecting a sub-stream to be processed, such as decoded, transcoded and/or organized into data packets for transmission, during the media session. The media server should then not use more than one media alternative from each alternate group at a time in order to give a complete presentation regardless of whether the alternate group is defined on media track or sub-track level.

Options in an alternate group therefore serve as alternatives to one another, i.e. they represent the same content but may differ with respect to quality, resolution, codec, audio language, etc. All options in an alternate group share the same alternate group identifier and are candidates for media selection before the media session begins.

In an alternative embodiment, the selection information corresponds to a sub-track specific switch group identifier that is applicable when switching between different streams (complete media tracks) and/or sub-tracks (media data portions corresponding to a sub-track) during an ongoing media session.

Options in a switch group belong to the same alternate group. The options in the same switch group share the same switch group identifier and are available for switching during the media session, whereas options in different switch groups are not. Different switch groups can be regarded as representing different operation points, such as different frame size, high versus low quality, different languages, etc. Options inside a switch group also represent different operation points, for example, in quality.

In a particular embodiment, the selection information assigned on sub-track level contains both an alternate group identifier and a switch group identifier.

The examples discussed above in connection with the prior art can now be effectively handled according to embodiments as disclosed herein:

SVC Content Classes

| Content | Layer | Track ID | Alternate group | Switch group | AG sub-track | SG sub-track |
|---|---|---|---|---|---|---|
| SVC free | BL | 1 | 0 | 0 | 1 | 1 |
| SVC premium | EL | | | | 1 | 2 |

In this case, the media track defining the base layer data portion and the enhancement layer data portion is assigned alternate and switch group identifiers according to a predefined value, such as 0, indicating that the media track comprises multiple sub-tracks and that the alternate and switch group identifiers are instead assigned per sub-track.

The free and premium SVC data is assigned the same alternate group sub-track identifier to indicate that they belong to the same alternate group and are alternatives or options during media processing. Thus, clients having paid extra for the premium content should obtain data packets containing the media data portion relating to the enhancement layer and the base layer, where the latter may be needed in order to decode the enhancement layer. Other non-premium clients should, however, merely receive the base layer data.

The two sub-tracks are assigned different sub-track switch group identifiers to indicate that during a media session no switch from the sub-stream relating to the premium SVC content to the sub-stream of the free SVC content or vice versa should be allowed.

The sub-track specific selection information can also be used in connection with graceful degradation, where several quality layers of the same media content are available to allow bit rate adaptations. However, if the base layer contains adverts or is of a very low quality, it is desirable to instruct a media server that switching should only be done above a certain layer during an unexpected congestion or bit rate drop. Rather than unintentionally turning on adverts for the premium client, it may be desirable that the receiver conceals data packet losses. Such a solution can be designed to include:

| Content | Layer | Track ID | Alternate group | Switch group | AG sub-track | SG sub-track |
|---|---|---|---|---|---|---|
| SVC free | BL | 1 | 0 | 0 | 1 | 1 |
| SVC premium Q1 | EL1 | | | | 1 | 2 |
| SVC premium Q2 | EL2 | | | | 1 | 2 |

The two sub-tracks each defining a respective enhancement layer (EL1 and EL2) belong to the same switch group to allow switching between the two sub-streams defined by the sub-tracks during an ongoing media session. Switching should however not be allowed between the base layer defining sub-stream and any of the enhancement layer defining sub-streams.

MVC Views

| Content | View | Track ID | Alternate group | Switch group | AG sub-track | SG sub-track |
|---|---|---|---|---|---|---|
| H.263 left view | — | 1 | 1 | 1 | — | — |
| H.263 right view | — | 2 | 2 | 1 | — | — |
| MVC left view | 1 | 3 | 0 | 0 | 1 | 2 |
| MVC right view | 2 | | | | 2 | 2 |

There are two alternate groups in this example, one relating to the left view of a scene and the other relating to right scene view. Both alternate groups contain the complete media data of a media track (H.263 track 1 or 2) and the MVC view data of a sub-track (MVC sub-track 1 or 2). In this case different codecs have been employed for encoding the H.263 and the MVC data. As a consequence, switching between H.263 encoded data and MVC encoded data is not desired. Therefore different switch group identifiers should be used for the H.263 left view and the MVC left view data belonging to the same alternate group. The same also applies to the H.263 right view and the MVC right view data. Note that since switch groups are defined locally within an alternate group the same switch group indices can be re-used as has been done above. Alternatively, the switch group identifies could be, for instance, 1, 3, 2, 4 instead of 1, 1, 2, 2.

The above example illustrates that embodiments can be used to address individual views of MVC content and also how to relate alternatives of single track media types (H.263) with layered media types (MVC).

Another example concerning MVC is that a file may contain many views but only some of them are suitable for smooth switching. Consider the situation illustrated in FIG. 4 with two camera clusters, e.g. three cameras 80-82 from the left and three cameras 83-86 from the right of an object 86. In such a case, smooth switching is only possible within each cluster to get a free-viewpoint experience. This situation can be handled according to below:

| Content | View | Track ID | Alternate group | Switch group | AG sub-track | SG sub-track |
|---|---|---|---|---|---|---|
| MVC left view | 1 | 1 | 0 | 0 | 1 | 1 |
| MVC left view | 2 | | | | 1 | 1 |
| MVC left view | 3 | | | | 1 | 1 |
| MVC right view | 4 | | | | 1 | 2 |
| MVC right view | 5 | | | | 1 | 2 |
| MVC right view | 6 | | | | 1 | 2 |

All views are alternatives when setting up a media session, indicated by assigning the same alternate group identifier to all sub-tracks. However, switching should only be allowed among the left views respective the right views. As a consequence, all left view sub-tracks are assigned the same switch group identifier that is, though, different from the switch group identifier assigned to all right view sub-tracks.

A media track can be assigned so-called track selection information having a predefined value indicating that the media track comprises multiple sub-tracks. This track selection information includes the alternate group identifier and/or switch group identifier assignable on track level. In the examples above, the predefined value has been zero to thereby signal that no alternate/switch group identifier applicable to the whole media track is available but instead sub-track specific alternate/switch group identifiers are included in the media container file.

A media server can then simply investigate the alternate/switch group identifier field or box in the media container file in order to determine whether track-specific or sub-track-specific alternate/switch group identifiers should be used for the current media content. With reference to the ISO base media file format, in such a case the track selection box could be absent or the switch group set to 0 and/or the alternate group in the track header box is set to 0.

In an alternative approach, track selection information, such as alternate and/or switch group identifiers, can be assigned on track-level for a media track defining multiple sub-tracks. In such a case, sub-track specific selection information can be assigned to one or a portion of the multiple sub-tracks, whereas remaining sub-tracks of the media track do not have any sub-track specific selection information. These remaining sub-tracks instead inherit the alternate/switch group identifier(s) assigned to the media track. In this situation, a media server processing the final media container file investigates whether the media track has any non-zero alternate/switch group identifier and additionally investigates whether such alternate/switch group identifiers are provided for the sub-tracks. If the dedicated alternate/switch group identifier(s) is(are) assigned to a sub-track this(these) identifier(s) is(are) used for the sub-track instead of the track-specific alternate/switch group identifiers.

| Content | View | Track ID | Alternate group | Switch group | AG sub-track | SG sub-track |
|---|---|---|---|---|---|---|
| MVC left view | 1 | 1 | 1 | 0 | — | 1 |
| MVC left view | 2 | | | | — | 1 |
| MVC left view | 3 | | | | — | 1 |
| MVC right view | 4 | | | | — | 2 |
| MVC right view | 5 | | | | — | 2 |
| MVC right view | 6 | | | | — | 2 |

This example schematically illustrates using alternate group identifier on media track level but switch group identifiers for each sub-track defined by the media track.

| Content | Layer | Track ID | Alternate group | Switch group | AG sub-track | SG sub-track |
|---|---|---|---|---|---|---|
| SVC free | BL | 1 | 1 | 1 | — | — |
| SVC premium Q1 | EL1 | | | | 1 | 2 |
| SVC premium Q2 | EL2 | | | | 1 | 2 |

In this example, the sub-track defining the base layer inherits the alternate and switch group identifiers of the complete media track, whereas the two sub-tracks defining different enhancement layers have their own assigned alternate and switch group identifiers.

FIG. 7 is a flow diagram illustrating an additional, optional step of the generating method. The method continues from step S3 in FIG. 1. A next step S30 provides track selection information to the media track. The selection information preferably includes an alternate group identifier and/or a switch group identifier. The value of the selection information could be a predefined value, such as zero, indicating that no alternate/switch group identifiers are given on media track level but instead each sub-track is assigned respective selection information. If there is selection information on the track level, then this information is used for all sub-tracks defined by the media track unless a sub-track has specifically assigned selection information. Thus, selection information assigned on sub-track level takes precedence over track selection information that is assigned on media track level.

The method then continues to step S4 of FIG. 1.

In the following, embodiments will be described in more detail with reference to a particular implementation of the media container file in terms of using the ISO base media file format [1]. Alternative container file formats that can be used include, the MP4 file format, 3GP file format, AVC, SVC, MVC and QuickTime format.

The ISO base media file format is designed to contain timed media information for a presentation in a flexible, extensible format that facilitates interchange, management, editing and presentation of the media. The presentation may be local to the system containing the presentation or may be via a network or other stream delivery mechanism. An advantage of using a media container file in the form of an ISO base media file is that it is designed to be independent of any particular network protocol while enabling efficient support of them in general.

The file structure of the ISO base media file format is object-oriented meaning that a container file can be decomposed into constituent objects very simply and the structure of the objects is inferred directly from their type. A media container file that is based on the ISO base media file format can be regarded as being defined by a number of boxes, which are object-oriented building blocks defined by a respective unique identifier.

Figure 8:
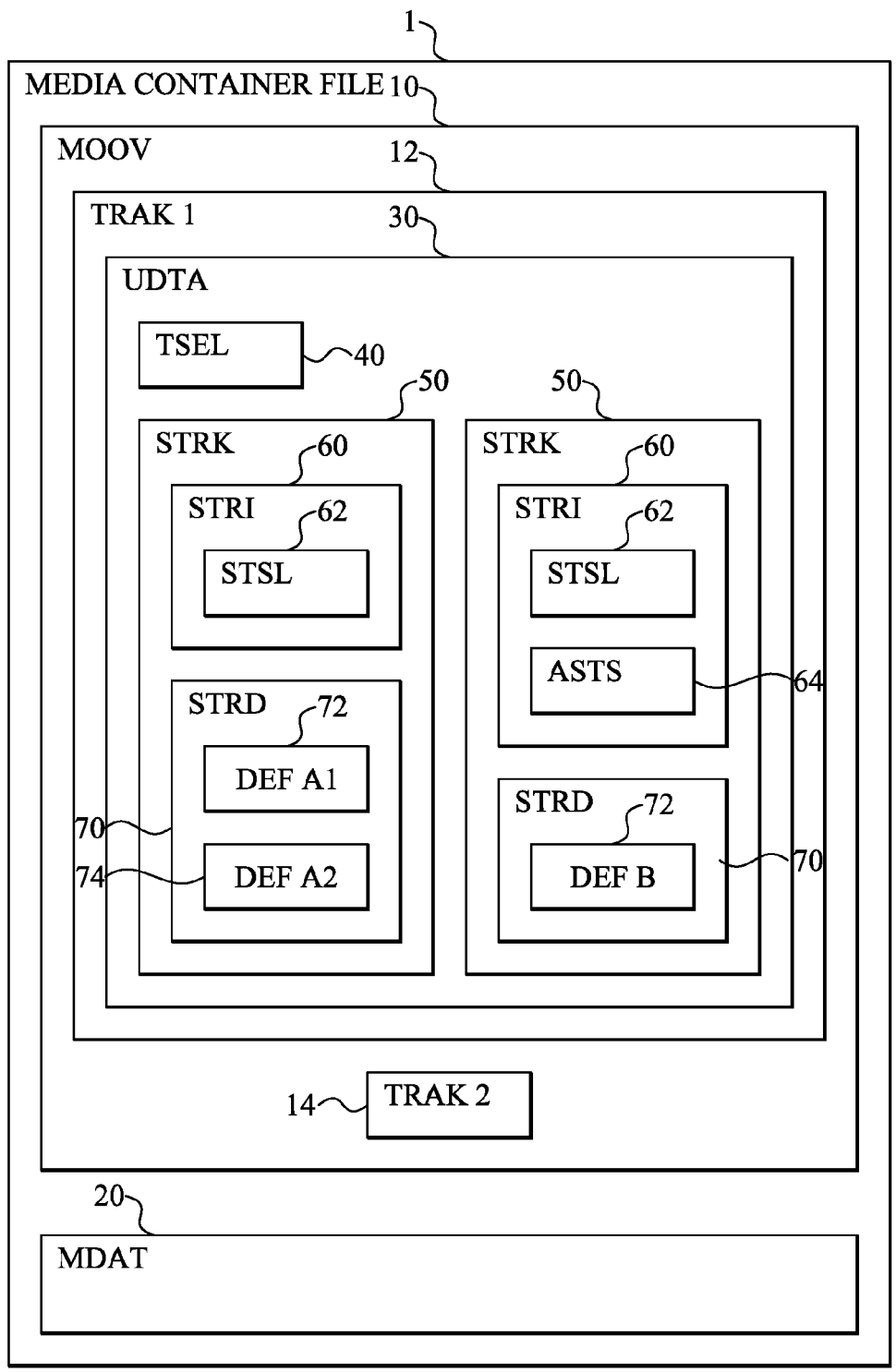
FIG. 8 is a schematic illustration of a media container file according to an embodiment.

With reference to FIG. 8, an embodiment of a media container file 1 conforming to the ISO base media file format is illustrated.

The media container file 1 preferably comprises a movie box ('moov') that is a container box whose sub-boxes define the metadata for a presentation.

Movie Box
Definition:
Box Type: 'moov'
Container: File
Mandatory: Yes
Quantity: Exactly one The metadata for a presentation is stored in the single movie box 10, which occurs at the top-level of the media container file 1. Normally this movie box 10 is close to the beginning or end of the media container file 1, though this is not required.
Syntax:

aligned(8) class MovieBox extends Box('moov') {
}

The movie box 10 contains the tracks 12, 14 that define timed sequence of related media data samples in the media container file 1.
Track Box
Definition:
Box Type 'trak'
Container: Movie Box ('moov')
Mandatory: Yes
Quantity: One or more The track box 12, 14 is a container box for a single track of presentation. Each track 12, 14 carry its own temporal and spatial information. Track boxes 12, 14 are used to define media data in terms of media tracks and to contain packetization information for delivery of the media data, such as by streaming, in terms of so-called hint tracks.
Syntax:

```
aligned (8) class TrackBox extends Box('trak') {
}
```

FIG. 8 has non-limitedly illustrated the media container file 1 as containing two track boxes 12, 14. This should, however, merely be seen as an illustrative example as the media container file 1 can contain one or more such track boxes 12, 14. In the figure, the track box 12 is a media track that defines media data comprising multiple media data portions as previously described. The media track 12 will consequently contain multiple sub-tracks as is further described herein.

The track box 12 preferably comprises a user data box 30 that contains objects that declare user information about the containing box and its data, i.e. presentation or track. The user data box 30 can therefore be seen as a container box for informative user-data that is formatted as a set of boxes with more specific box types, which declare more precisely their content.

The media container file 1 also comprises a media data box ('mdat') that holds the actual media data for a presentation.
Media Data Box
Definition:
Box Type: 'mdat'
Container: File
Mandatory: No
Quantity: Any number The media data box 20 comprises the media data. For instance, with video tracks 12, 14 this box 20 would include video frames.
Syntax:

```
aligned(8) class MediaDataBox extends Box('mdat') {
    bit(8) data[ ];
}
```

Data represents the actual media data.
User Data Box
Definition:
Box Type: 'udta'
Container: Movie Box ('moov') or Track Box ('trak')
Mandatory: No
Quantity: Zero or one
Syntax:

```
aligned(8) class UserDataBox extends Box('udta') {
}
```

In the line with the previous discussion herein, all tracks in an alternative group are candidates for media selection, this is achieved by assigning all media tracks to the same alternate group. Information of alternate group identifier is provided in the track header box (not illustrated) associated with the track box 12. According to the ISO base media file format the syntax for the track header box ('tkhd') is presented as:

```
aligned(8) class TrackHeaderBox extends Fullbox('tkhd', version, flags) {
    ...
    template int(16) alternate_group = 0;
    ...
}
```

This alternate group identifier is applicable on track-level and therefore applies to the whole media data defined by the media track 12 unless a sub-track of the media track 12 has its specific sub-track alternate group identifier. In a preferred implementation, a zero value of the alternate group identifier signals that the media track comprises multiple sub-tracks that can have their own sub-track alternate groups. If the field is not 0 it should be the same for tacks 12 that contain alternate data for one another and different for tracks 12 belonging to different such groups. A sub-track defined by the track 12 can then inherit this alternate group identifier unless it has its own sub-track alternate group identifier.

The user data box 30 optionally comprises a track selection box ('tsel') 40 used for defining the switch group identifier applicable to the media track 12.
Track Selection Box
Definition:
Box Type 'tsel'
Container: User Data Box ('udta')
Mandatory: No
Quantity: Zero or one The track selection box 40 is contained in the user data box 30 of the track 12 it relates to.
Syntax:

```
aligned(8) class TrackSelectionBox extends FullBox('tsel', version = 0, 0)
{
    template int(32) switch_group = 0;
    unsigned int(32) attribute_list[ ]; // to the end of the box
}
```

The attribute list is used as descriptions of tracks or differentiation criteria for tracks in the same alternate or switch group. The switch group identifier can be zero, in which case the decoder can look-up for sub-track selection groups in the media container file. A non-zero value can be inherited by any sub-track that does not have its own sub-track switch group identifier.

According to the embodiments, the user data box 30 contains, if the track comprises sub-tracks, so called sub-track boxes ('strk') 50, which specify the sub-tracks in the current track.
Sub-Track Box
Definition:
Box Type: 'strk'
Container: User Data Box ('udta')
Mandatory: No
Quantity: Zero or more The sub-track box 50 comprises the objects that define and provide information about a sub-track in the current media track 12.
Syntax:

```
aligned(8) class SubTrack extends Box('strk') {
}
```

The sub-track box 50 is a container that comprises two boxes: the sub-track information box ('str') 60 and the sub-track definition box ('strd') 70.

The sub-track information box 60 comprises the sub-track description. This can, for example, be which switch and/or alternate group the sub-track belongs to and other attributes of the sub-track. In a particular embodiment, the alternate and switch group numbers are used through the media container file 1. This means that the same identifier format or numbering is shared between track alternate/switch group identifiers and sub-track alternate/switch group identifiers. In this way, an alternate or switch group may contain both tracks and sub-tracks.

Sub-Track Information Box
Definition:
Box Type: 'stri'
Container: Sub-Track Box ('strk')
Mandatory: Yes
Quantity: One The sub-track information box 60 comprises the objects that provide information about the sub-track.
Syntax:

```
aligned(8) class SubTrackInformation extends Box('stri') {
}
```

The sub-track definition box 70 is a container box that comprises the boxes that define the sub-track. The sub-track is defined as the union of the sample sub-sets determined by the boxed in the sub-track definition box. The boxes defining these sub-sets can be determined in the corresponding file format standards, such as SVC and MVC file format standards.

Sub-Track Definition Box
Definition:
Box Type: 'strd'
Container: Sub-Track Box ('strk')
Mandatory: Yes
Quantity: One The sub-track definition box 70 comprises the objects that provide a definition of the sub-track.
Syntax:

```
aligned(8) class SubTrackDefinition extends Box('strd') {
}
```

In alternative implementations of the media container file 1, the proposed structure can be realized without the sub-track information box 60 and the sub-track definition box 70. In such a case, the boxes present in the sub-track information box 60 and the sub-track definition box 70 can instead be placed directly in the sub-track box 50. However, the structure with sub-track information box 60 and sub-track definition box 70 is advantageous as more information can be gathered. For example, if a file parser finds in the sub-track definition box 70 a box that it does not recognize, it would know that this is the box that defines the sub-track.

In similar to the ISO base media file format standard, a sub-track selection box ('stsl') 62 is defined and preferably included in the sub-track information box 60. The sub-track selection box 62 comprises the sub-track switch group identifier applicable to the current switch group.

Sub-Track Selection Box
Definition:
Box Type: 'stsl'
Container: Sub-Track Information Box (stri)
Mandatory: No
Quantity: Zero or one Syntax:

```
aligned(8) class SubTrackSelectionBox extends Fullbox('stsl',
version = 0, 0) {
   template int(32) switch_group = 0;
   unsigned int(32) attribute_list[ ]; // to the end of the box
}
```

Switch_group is the sub-track switch group identifier and is an integer that specifies a group or collection of tracks and/or sub-tracks. If the field is 0, i.e. default value, or if the sub-track selection box 62 is absent then there is no information on whether the sub-track can be used for switching during playback or streaming. Tracks/sub-tracks that belong to the same switch group should also belong to the same alternate group.

Attribute_list is a list of attributes that should be used as descriptions of sub-tracks or differentiating criteria for tracks/sub-tracks in the same alternate or switch group.

Examples of descriptive attributes that can be used include:

| Name | Attribute | Description |
| --- | --- | --- |
| Temporal scalability | 'tesc' | The sub-track can be temporally scaled. |
| Fine-grain SNR scalability | 'fgsc' | The sub-track can be fine-grain scaled. |
| Coarse-grain SNR scalability | 'cgsc' | The sub-track can be coarse-grain scaled. |
| Spatial scalability | 'spsc' | The sub-track can be spatially scaled. |
| Region-of-interest scalability | 'resc' | The sub-track can be region-of-interest scaled. |

Examples of differentiating attributes that can be used include:

| Name | Attribute | Pointer |
| --- | --- | --- |
| Bitrate | 'bit' | Total size of the samples in the sub-track divided by the duration in the track header box. |
| Frame rate | 'frar' | Number of samples in the sub-track divided by duration in the track header box. |

The alternate sub-track selection box ('asts') 64 is used for assigning alternate group identifiers. This box 64 is optional and if the same alternate group applies to all sub-tracks, there is no need to include the alternate sub-track selection box 64.

Alternate Sub-Track Selection Box
Definition:
Box Type: 'asts'
Container: Sub-Track Information Box ('stri')
Mandatory: No
Quantity: Zero or one

```
aligned(8) class AlternateSubTrackSelectionBox extends FullBox('asts',
version = 0, 0) {
   template int(32) alternate_group = 0;
}
```

Alternate_group is the sub-track alternate group identifier and is an integer that specifies a group or collection of tracks and/or sub-tracks. If this field is 0, i.e. default value, or if the alternate sub-track selection box 64 is absent, then there is no information on possible relations to other tracks/sub-tracks.

If this field is not 0, it should be the same for tracks/sub-tracks that contain alternate data for one another and different for tracks/sub-tracks belonging to different such groups. Only one track/sub-track within an alternate group should be played or streamed at any one time.

Specific sub-track definition boxes 72, 74 are allocated in the sub-track definition selection box 70. These boxes 72, 74 are typically codec specific and determine the parts of the track belonging to a particular sub-track. If more than one sub-track definition box 70 is present, a union of the sub-track definitions defines the sub-track.

In the following, different embodiments of defining sub-tracks will be disclosed with reference to SVC and MVC data. If other codecs are employed to generate media data that can be organized into sub-tracks, the definition boxes will be adapted accordingly for those codecs. The basic purpose of the definition boxes is to identify the part(s) of the media track that belong to the sub-track. Codec-specific identifiers can therefore be used.

SVC Embodiments
SVC Sub-Track Layer Box
Definition:
Box Type: 'sstl'
Container: Sub-Track Definition Box ('strd')
Mandatory: No
Quantity: Zero or more
Syntax:

```
aligned(8) class SVCSubTrackLayerBox extends FullBox('sstl') {
    unsigned int(16) item_count;
    for (i = 0; i < item_count; i++) {
        unsigned int(3) DependencyId;
        unsigned int(4) QualityId;
        unsigned int(3) TemporalId;
        unsigned int(6) reserved;
    }
}
```

The list of triplets dependency identifier, quality identifier and temporal identifier (DQT) specifies parts of the media track that belong to the sub-track. A unique combination of dependency identifier, quality identifier and temporal identifiers determines the SVC layer. Therefore, each DQT triplet listed in the sub-track layer box determines a single SVC operating point. A union of different DQT-triplet values and therefore a union of SVC layers describes the sub-track defined by the box.

Item_count counts the number of DQT triplets listed in this box and the dependency/quality/temporal identifiers indicate the dependency/quality/temporal identifier value of the network abstraction layer (NAL) units.

SVC Sub-Track Tier Box
Definition:
Box Type: 'stti'
Container: Sub-Track Definition Box ('strd')
Mandatory: No
Quantity: Zero or more
Syntax:

```
aligned(8) class SubTrackTierBox extends FullBox('stti') {
    unsigned int(16) item_count;
    for (i = 0; i < item_count; i++) {
        unsigned int(16) tierId;
    }
}
```

The union of tier identifiers in this box describes the sub-track defined by the box. The tier is in this case a SVC tier. As is known in the art, a tier is a set of layers that represents an operating point at the bitstream. In order to map NAL units to a tier, sample groups and map groups can be used. The sample groups make the partitioning of samples between the groups. However, as there can be several NAL units in one sample, the map groups can be used to assign NAL units in one sample to different sample groups. The tier includes one or more such sample groups.

Item_count counts the number of tiers described in this sub-track tier box and tierId gives the identifier of the tier(s) which is contained in the sub-track.

SVC Sub-Track Sample Group Box
Definition:
Box Type: 'stsg'
Container: Sub-Track Definition Box ('strd')
Mandatory: No
Quantity: Zero or more
Syntax:

```
aligned(8) class SubTrackSampleGroupBox extends Fullbox('stsg') {
    unsigned int(16) item_count;
    for (i = 0; i < item_count; i++) {
        unsigned int(16) groupId;
    }
}
```

In this embodiment, sample groups are used directly instead of tiers to split the track into sub-tracks. The sample groups can also be used together with map groups.

Item_count counts the number of sample groups described in this sub-track tier box and groupId gives the identifier of the group entry. Group identifiers are arbitrary values but are unique for the sample groups.

The above given embodiments are examples of how SVC sub-tracks can be defined. Any of these embodiments can be used in the media container file 1.

An alternative solution for SVC data is possible when using tiers or extractors in the media container file 1. Grouping of tiers is performed in the SVC file format [3]. In order to group the tiers based on the content, a new switch group box ('swgr') is added to the primary definition of the tier. In such a case, switching between tiers, i.e. sets of operating points that belong to the same content group is allowed. Switching between the tiers that belong to different content groups is not allowed. This alternative solution does not need to define the sub-tracks. Instead it modifies the tier definition. The drawback of this solution is that it is less generic than using explicit sub-tracks.

Switch Group Box
Definition:
Box Type: 'swgr'
Container: Scalable Group Entry
Mandatory: No
Quantity: Zero or one
Syntax:

```
aligned(8) class SwitchGroupBox extends Box('swgr') {
    unsigned int(32) content_group = 0;
}
```

Content_group is an integer that specifies a group or a collection of tiers that have the same content. If this field is 0 or there is no switch group box then the track belongs by default to the content group 0. Switching can be performed between the tiers that belong to the same content group but is not allowed between tiers which belong to different groups. A content group preferably only has one member. Thus, content_group is in this case an example of selection information that can be assigned to sub-tracks according to an embodiment.

The switch group box is optional and is then present in the primary definition of the tier. The switch group box can be added to the scalable group entry according to the following example:

```
aligned(8) class ScalableGroupEntry extends
VisualSampleGroupEntry('scif') {
    unsigned int(8) groupId;
    unsigned int(8) primary_groupId;
    unsigned int(1) is_tier_IDR;
    unsigned int(1) noInterLayerPredFlag;
    unsigned int(1) useRefBasePicFlag;
    unsigned int(1) storeBaseRepFlag;
    unsigned int(1) is_tl_switching_point;
    unsigned int(3) reserved = 0;
    unsigned int(8) tl_switching_distance;
    if (groupId == primary_groupId)     // primary definition of tier
    {
        TierInfoBox( );                   // mandatory
        SVCDependencyRangeBox( );         // mandatory
        SVCPriorityRangeBox( );           // mandatory
        TierBitRateBox( );                // optional
        RectRegionBox( );                 // optional
        BufferingBox( );                  // optional
        TierDependencyBox( );             // optional
        InitialParameterSetBox( );        // optional
        IroiInfoBox( );                   // optional
        ProtectionSchemeInfoBox( );       // optional
        TranscodingInfoBox( );            // optional
        SwitchGroupBox( );                // optional
    }
}
```

MVC Embodiments
MVC Sub-Track View Box
Definition:
Box Type: 'mstv'
Container: Sub-Track Definition Box ('strd')
Mandatory: No
Quantity: Zero or more
Syntax:

```
aligned(8) class MVCSubTrackViewBox extends FullBox('mstv') {
    unsigned int(16) item_count;
    for (i = 0; i < item_count; i++) {
        unsigned int(10) ViewId;
        unsigned int(3) TemporalId;
        unsigned int(2) reserved;
    }
}
```

The list of pairs of view identifier and temporal identifier specifies parts of the track that belong to the sub-track. A combination of view and temporal identifier determines the MVC layer. Therefore each such identifier pair listed in the MVC sub-track view box determines a single MVC operating point. A union of different pairs of identifier values and therefore a union of MVC views at a particular temporal resolution describes the sub-track defined by this box.

Item_count counts the number of view identifier and temporal identifier pairs listed in the box and view/temporal identifier indicates the identifier value in the MVC NAL unit header.

In an alternative embodiment, the MVC sub-track view box only lists the view identifier and not the temporal identifier. Then the definition of sub-track includes all MVC layers with the specified view identifier MVC Sub-Track Tier Box
Definition:
Box Type: 'stti'
Container: Sub-Track Definition Box ('strd')
Mandatory: No
Quantity: Zero or more
Syntax:
aligned(8) class SubTrackTierBox extends FullBox('stti') {
    unsigned int(16) item_count;
    for (i=0; i<item_count; i++) {
        unsigned int(16) tierId;
    }
}

The union of tier identifiers in this box describes the sub-track defined by the box. The tier is in this case an MVC tier.

Item_count counts the number of tiers described in this sub-track tier box and tierId gives the identifier of the tier(s) which is contained in the sub-track.

MVC Sub-Track Multiview Group Box
Definition:
Box Type: 'stmg'
Container: Sub-Track Definition Box ('strd')
Mandatory: No
Quantity: Zero or more
Syntax:

```
aligned(8) class MVCSubTRckMultiviewGroupBox extends
FullBox('stmg') {
    unsigned int(16) item_count;
    for (i = 0; i < item_count; i++) {
        unsigned int(16) MultiviewGroupId;
    }
}
```

The union of multiview group identifiers in the box describes the sub-track defined by the box. Item_count counts the number of multiview groups described in the box and multiview group identifier gives the identifier(s) of the multiview group(s) which is(are) contained in the sub-track. Multiview group identifier is preferably the identifier of the multiview group defined in the MVC file format.

MVC Sub-Track Sample Group Box
Definition:
Box Type: 'stsg'
Container: Sub-Track Definition Box ('strd')
Mandatory: No
Quantity: Zero or more
Syntax:

```
aligned(8) class SubTrackSampleGroupBox extends Fullbox('stsg') {
    unsigned int(16) item_count;
    for (i = 0; i < item_count; i++) {
        unsigned int(16) groupId;
    }
}
```

In this embodiment, sample groups are used directly instead of tiers to split the track into sub-tracks. The sample groups can also be used together with map groups.

Item_count counts the number of sample groups described in this sub-track tier box and groupId gives the identifier of the group entry. Group identifiers are arbitrary values but are unique for the sample groups.

The above given embodiments are examples of how MVC sub-tracks can be defined. Any of these embodiments can be used in the media container file 1.

An alternative solution for MVC data is possible when using tiers or extractors in the media container file 1. Grouping of tiers is performed in the MVC file format. In order to group the tiers based on the content, a new switch group box ('swgr') is added to the primary definition of the tier. In such a case, switching between tiers, i.e. sets of operating points that belong to the same content group is allowed. Switching between the tiers that belong to different content groups is not allowed. This alternative solution does not need to define the sub-tracks. Instead it modifies the tier definition. The drawback of this solution is that it is less generic than using explicit sub-tracks.

Switch Group Box
Definition:
Box Type: 'swgr'
Container: Multiview Group Entry
Mandatory: No
Quantity: Zeor or one
Syntax:

```
aligned(8) class SwitchGroupBox extends Box('swgr') {
    unsigned int(32) content_group = 0;
}
```

Content_group is an integer that specifies a group or a collection of tiers that have the same content. If this field is 0 or there is no switch group box then the track belongs by default to the content group 0. Switching can be performed between the tiers that belong to the same content group but is not allowed between tiers which belong to different groups. A content group preferably only has one member. Thus, content_group is in this case an example of selection information that can be assigned to sub-tracks according to an embodiment.

The switch group box is optional and is then present in the primary definition of the tier. The switch group box can be added to the scalable group entry according to the following example:

```
aligned(8) class MultiviewGroupEntry extends
VisualSampleGroupEntry('scif') {
    unsigned int(8) groupId;
    unsigned int(8) primary_groupId;
    unsigned int(4) reserved = 0;
    unsigned int(1) is_tl_switching_point;
    unsigned int(3) reservered = 0;
    unsigned int(8) tl_switching_distance;
    if (groupId == primary_groupId)     // primary definition of tier
    {
        ViewIdentifierBox( );           // mandatory
        TierInfoBox( );                 // mandatory
        TierDependencyBox( );           // mandatory
        SVCPriorityRangeBox( );         // mandatory
        TierBitRateBox( );              // optional
        BufferingBox( );                // optional
        InitialParameterSetBox( );      // optional
        ProtectionSchemeInfoBox( );     // optional
        ViewPriorityBox( );             // optional
        SwitchGroupBox( );              // optional
    }
}
```

The above described organization of a media container file into different boxes defining the media data, containing the media data and identifying sub-tracks and alternate/switch group identifiers should be seen as a particular implementation embodiment. Other organizations of the media data and the descriptive information (meta data) mentioned above can alternatively be used in other embodiments.

FIG. 9 is a schematic overview of a communication network illustrating the parties generating or using the media container file 1. A media content server 100 represents the content provider or creator that receives or has access to media data and constructs a media container file 1. A copy of this media container file 1 is sent to a media processing server 200 that uses the media container file 1 in a media session for compiling data packets containing media that is transmitted (multicast) to different clients 300, 310, 320 represented by mobile terminals in the figure. The communication network can advantageously be a so-called proprietary network having a network operator. An example of such a communication network is a wireless, radio-based communication network providing communication services to mobile telephones.

In the figure, the media content server 100 and the media processing server 200 have been illustrated as separate servers that advantageously are arranged at different network nodes, such as base stations, of the communication network. In an alternative approach the operations of these two servers 100, 200 may indeed be concentrated to a single network node in which case one and the same server performs the operations of the media content server 100 and the media processing server 200.

Figure 10:
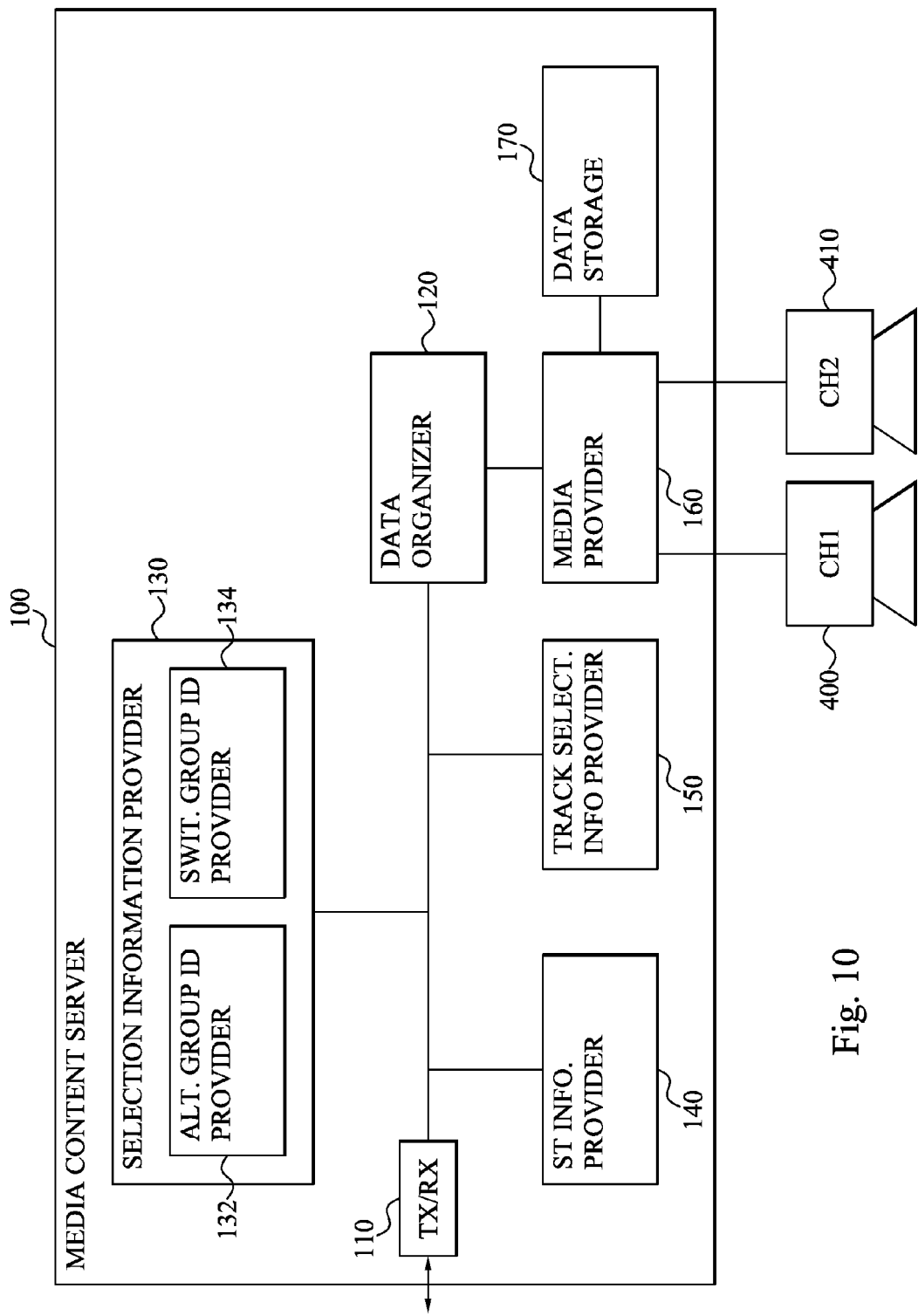
FIG. 10 is a schematic block diagram of an embodiment of a media content server.

FIG. 10 is a schematic block diagram of a media content server 100 according to an embodiment. The media content server 100 comprises a transmitter and receiver 110 or a common transceiver (TX/RX). The receiver is in particular arranged for receiving input media content and for receiving requests for media container files. The transmitter is correspondingly in particular employed by the media content server 100 when transmitting such media container files to other servers in the communication network. The transmitter/receiver 110 illustrated in the figure comprises the functionality required for effecting transmission and reception of data, which is well known in the art and include, among others, modulator/demodulator, encoder/decoder, etc. In the case of a wired transmission of data, the transmitter/receiver 110 can be exchanged by a general input and output (I/O) unit that performs similar transmitting/receiving functions as the transmitter/receiver 110.

The media content server 100 comprises a media provider 160 that is arranged for providing the media data to be organized in the media container file. The media provider 160 can get the actual media data from a remote but connected media source or engine 400, 410 possibly through the transmitter 110. Alternatively, the media data has previously been provided to the media content server 100 and is stored in a data storage 170. The media provider 160 then retrieves the relevant media data from the storage 170. In a further embodiment, the media provider 160 actually generates the media data itself and therefore comprises media generating and/or recording equipment.

The media data from the media provider 160 is forwarded to a data organizer 120 that organizes the media data in the media container file, such as in the media data box illustrated in FIG. 8. The provided and organized media data is defined by a media track in the media container file as previously described and comprises multiple data portions defining respective sub-streams.

A sub-track information provider 140 is implemented in the media content server 100 for providing sub-track information in the media container file. This sub-track information enables identification of the media data portion of the organized media data that that belongs to a particular sub-track of the media track. Thus, each of the multiple sub-tracks defined by the media track comprises associated sub-track information for identifying the relevant media data portion to which the sub-track applies.

The media content server 100 also comprises a selection information provider 130 that provides selection information for at least one sub-track in the media container file. The selection information defines the selective processing of the media data portion defined by the at least one sub-track in relation to other media data organized in the media container file as previously described.

The selection information provider 130 optionally comprises an alternate group identifier provider 132 implemented to provide a sub-track alternate group identifier to at least one sub-track in the media container file. In such a case, this alternate group identifier is applicable to the particular sub-tracks whereas other sub-tracks contained in the same media track have own alternate group identifiers or share or inherit an alternate group identifier that is assigned by an optional track selection information provider 150 to the complete media track.

An optional switch group identifier provider 134 of the selection information provider 130 is implemented to provide a sub-track switch group identifier to at least one sub-track in the media container file. The switch group identifier provider 134 can assign respective switch group identifiers to all sub-tracks of the media track or only a portion thereof. In the latter case, the sub-tracks that are not assigned switch group identifiers preferably use a switch group identifier assigned by the track selection information provider 150 to the complete media track.

The input to the selection information provider 130 used to define the values of the selection information, preferably the alternate and/or switch group identifiers, can come from the content creator that is aware of which sub-tracks that should be alternative to other sub-tracks/tracks in the media container file and among which sub-tracks/tracks that switching should be allowed or prevented. Alternatively, the selection information provider 130 could automatically determine these values based on information of the provided media data. For instance, the selection information provider can be preconfigured to prevent switching between regular and premium content, between media data encoded by different codecs, between media data with different audio languages, but, for instance, allow switching between content available in different quality levels.

The media content server 100 is advantageously suitable for handling SVC and MVC data. The sub-track information provider 140 is then arranged for providing sub-track information defining the media data portions that should be organized into different sub-tracks corresponding to the base and enhancement layers or base and additional views for the content.

The track selection information provider 150 may advantageously assign track selection information, e.g. alternate and/or switch group identifier, applicable to the complete media track and having a predefined value, such as zero, indicating that the media track comprises multiple sub-tracks as previously described.

The units 110 to 160 of the media content server 100 may be implemented or provided as software, hardware or a combination thereof. In the case of a software-based implementation, a computer program product implementing the media content server 100 or a part thereof comprises software or a computer program run on a general purpose or specially adapted computer, processor or microprocessor. The software includes computer program code elements or software code portions illustrated in FIG. 10. The program may be stored in whole or part, on or in one or more suitable computer readable media or data storage means such as magnetic disks, CD-ROMs, DVD disks, USB memories, hard discs, magneto-optical memory, in RAM or volatile memory, in ROM or flash memory, as firmware, or on a data server.

The units 110 to 170 may all be implemented in the media content server 100 in a single network node in a communications system. Alternatively, a distributed implementation is also possible and within the scope of the invention. In such a case, different units 110 to 170 of the media content server 100 may be arranged in different network nodes but will despite this perform their intended operations as described in the foregoing.

Figure 11:
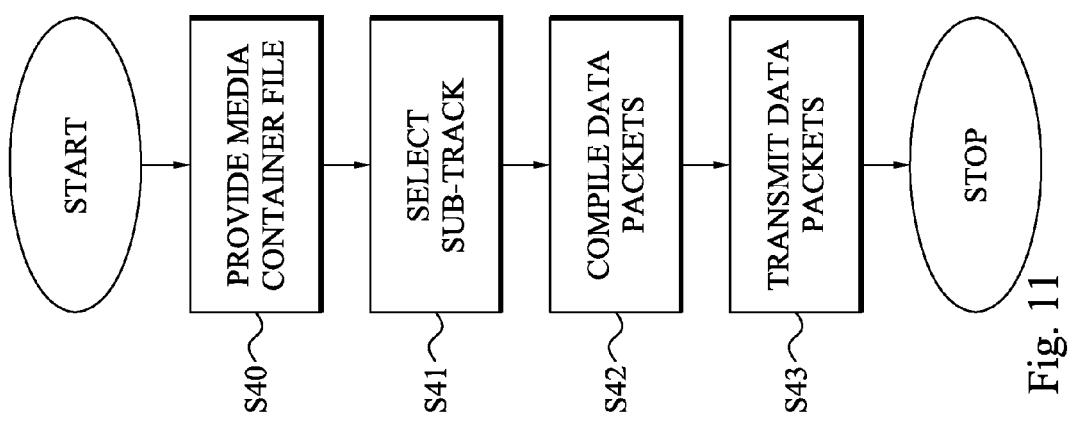
FIG. 11 is a flow diagram illustrating a media processing method according to an embodiment.

FIG. 11 is a flow diagram illustrating a media processing method according to an embodiment utilizing the media container file. The processing can advantageously be conducted by a media processing server in a communication network receiving the media container file from a media content server as illustrated in FIG. 9.

The method starts in step S40, where a media container file as disclosed herein is provided. The file provision of step S40 can be conducted according to different embodiments. For instance, the media container file is received from a media content server wired or wirelessly connected to the media processing server. Alternatively, the media container file can previously have been received from the remote media content server and is therefore retrieved in step S40 from a data storage. In yet another embodiment, the media container file is actually created in step S40, when the previously mentioned media content server and the media processing server are organized into a common media server.

A next step S41 selects a sub-track of the multiple sub-tracks defined in the media container file. The sub-track selection is performed based on an alternate group identifier assigned to the sub-track and present in the media container file. In this case, the media container file consequently defines an alternate group comprising multiple tracks/sub-tracks that are assigned the same alternate group identifier value. The sub-tracks or sub-track(s) and track(s) consequently constitute alternatives to use in a media session. The selection step S41 is conducted in connection with setting up the media session.

A next step S42 retrieves media data portion from the media container file defined by the sub-track. This data retrieval is performed based on sub-track information included in the media container file and enabling identification of the media data portion of the media data organized in the media container file that corresponds to the selected sub-track. The retrieved media data is compiled into data packets in step S42 and transmitted to at least one client or user terminal during the media session in step S43.

The method then ends.

Figure 12:
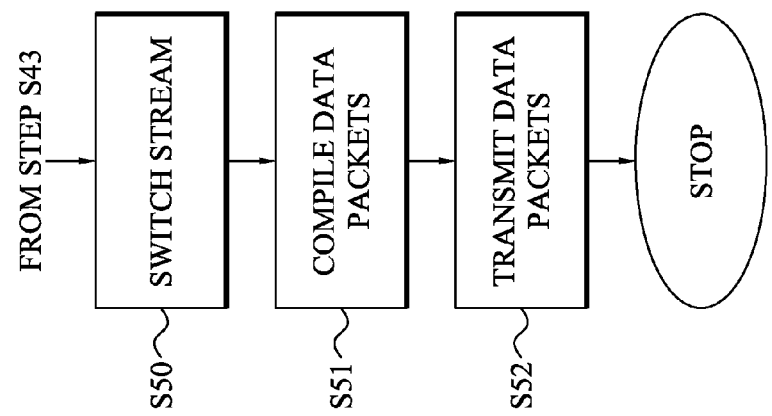
FIG. 12 is a flow diagram illustrating additional steps of the media processing method in FIG. 11 according to an embodiment.

FIG. 12 is a flow diagram illustrating a media processing method according to another aspect. In this case, the media session has already been started and a track or sub-track has already been selected in connection with setting up the media session. In this case, the method continues from step S43 of FIG. 11 and a next step S50 switches stream during the ongoing media session. Step S50 consequently involves selecting a sub-track defined in the media container file based on a switch group identifier assigned to the sub-track. The selected sub-track belongs to the same alternate group as the track or sub-track that was originally selected when setting up the media session. Additionally, the selected sub-track also has the same switch group identifier value as this track or sub-track and thereby belongs to the same switch group. The selected sub-track preferably relates to the same content as the original track or sub-track and can for instance relate to a different layer in the case of SVC data or a different view in the case of MVC data.

The stream switching of step S50 can be triggered according to various embodiments. For instance, a request or input message originating from the user terminal to which data packets are transmitted can trigger the switching criterion. Alternatively, signal quality or strength information estimated by the media processing server and/or the user terminal can be used to trigger a stream switch in step S50. Actually, any procedure known in the art for triggering switching between tracks can be used according to the embodiments to switch from a sub-track to another sub-track, from a track to a sub-track or indeed from a sub-track to a track, or according to the prior art from a track to another track. Also any known procedure for switching from a SVC layer to another layer or from a MVC to another view can be used.

The next step S51 retrieves the media data portion corresponding to the selected sub-track from the media container file. This retrieval is performed based on the sub-track information associated with the selected sub-track and included in the media container file. The retrieved media data is also organized into data packets. This step S51 is performed similar to step S42 of FIG. 11. A next step S52 transmits the data packets to the at least one user terminal participating in the ongoing media session. The method then ends.

Figure 13:
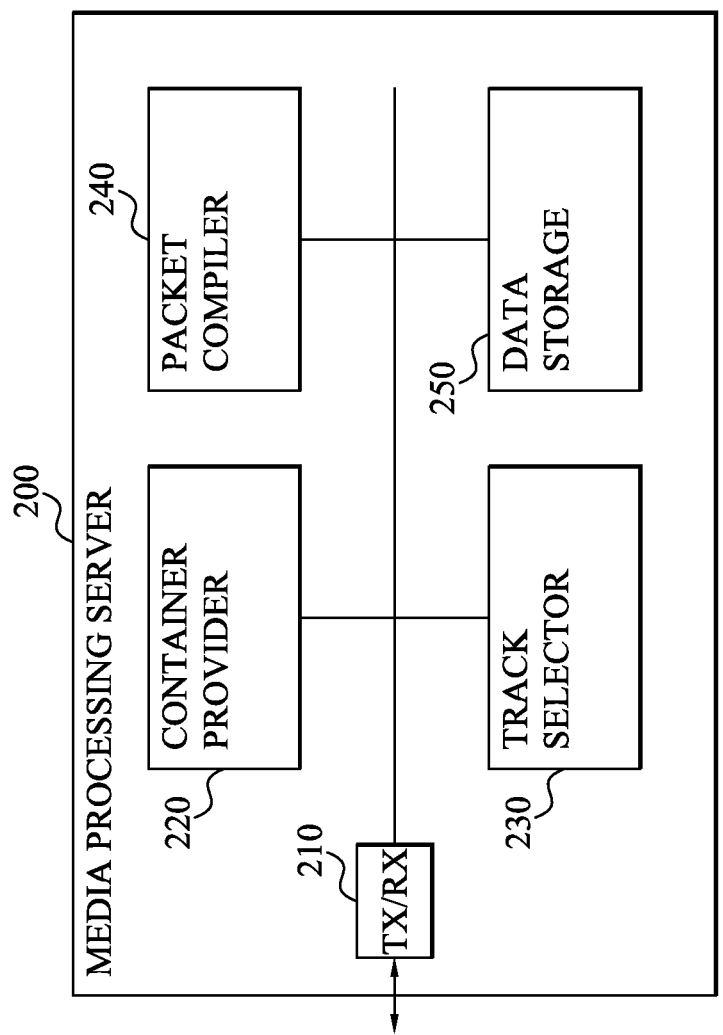
FIG. 13 is a schematic block diagram of an embodiment of a media processing server.

FIG. 13 is a schematic block diagram illustrating an embodiment of a media processing server 200. The media processing server 200 comprises a transmitter/receiver 210 arranged for conducting communication with external units. The receiver 210 is in particular arranged for receiving a media container file from a media content server unless the media container file is generated by a container provider 220 of the media processing server 200. The transmitter 210 is particularly arranged for transmitting data packets carrying media data fetched from the media container file to one or more user terminals in a media session.

The container provider 220 provides the media container file either from the receiver 210 or a data storage 250, in which the media container file has previously been stored. Alternatively, the container provider 220 can indeed constitute the functionalities of the media content server discussed above and illustrated in FIG. 10 to thereby create the media container file.

A track selector 230 of the media processing server 200 uses alternate group identifiers assigned to the tracks and sub-tracks in the media container file to select which track or sub-track to use when setting up the media session. In a preferred embodiment, the track selector 230 selects a sub-track among multiple sub-tracks relating to the same content and being defined in the media container file as previously disclosed. The track selector 230 is operable in connection with setting up a media session and thereby selects the initial track/sub-track to start the media session with.

A packet compiler 240 retrieves media data corresponding to the track/sub-track selected by the track selector 230. In the preferred embodiment when a sub-track is selected, the sub-track information associated with the selected sub-track and included in the media container file is used to identify the portion of the media data in the media container file to retrieve. The media data is organized and compiled into data packets, which are transmitted to at least one user terminal by the transmitter 210.

During the ongoing media session, the track selector 230 can switch to another sub-track or track relating to the same content as the initial sub-track or track. The track selector 230 performs such a switch based on the switch group identifier assigned to the tracks and sub-tracks in the media container file as previously described. The packet compiler 240 then retrieves media data associated with the newly selected sub-track or track and compiles the media data into data packets that are transmitted by the transmitter 210.

The units 210 to 240 of the media processing server 200 may be implemented or provided as software, hardware or a combination thereof. In the case of a software-based implementation, a computer program product implementing the media processing server 200 or a part thereof comprises software or a computer program run on a general purpose or specially adapted computer, processor or microprocessor. The software includes computer program code elements or software code portions illustrated in FIG. 13. The program may be stored in whole or part, on or in one or more suitable computer readable media or data storage means such as magnetic disks, CD-ROMs, DVD disks, USB memories, hard discs, magneto-optical memory, in RAM or volatile memory, in ROM or flash memory, as firmware, or on a data server.

The units 210 to 250 may all be implemented in the media processing server 200 in a single network node in a communications system. Alternatively, a distributed implementation is also possible and within the scope of the invention. In such a case, different units 210 to 250 of the media processing server 200 may be arranged in different network nodes but will despite this perform their intended operations as described in the foregoing.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] ISO/IEC 14496-12: 2008, Information technology—Coding of audio-visual objects—Part 12: ISO base media file format
[2] ISO/IEC 14496-15: 2004, Information technology—Coding of audio-visual objects—Part 15: Advanced Video Coding (AVC) file format
[3] ISO/IEC 14496-15: 2004/Amd 2: 2008, Information technology—Coding of audio-visual objects—Part 15: Advanced Video Coding (AVC) file format; Amendment 2: File format support for Scalable Video Coding (SVC)
[4] ISO/IEC 14496-15: 2004/FPDAmd 3, Information technology—Coding of audio-visual objects—Part 15: Advanced Video Coding (AVC) file format; Amendment 3: File format support for Multiview Video Coding
[5] ISO/IEC 14496-10: 2009, Information technology—Coding of audio-visual objects—Part 10: Advanced Video Coding

The invention claimed is:

1. A method of generating a media container file, said method comprising:
 a) organizing media data in said media container file, wherein the media container file comprises the media data to be transmitted to a client during a media session, said media data being defined by a media track in said media container file and comprises multiple media data portions constituting respective sub-streams;
 b) providing, in said media container file, sub-track information identifying, for each sub-track of multiple sub-tracks defined in said media track, the media data portion of said media data that belongs to said sub-track; and c) providing, in said media container file and for at least one sub-track of said multiple sub-tracks, selection information defining a selective processing of the media data portion defined by said at least one sub-track in relation to other media data organized in said media container file and relating to the same content as said media data portion defined by said at least one sub-track;

wherein the selection information is used by a media server in connection with the media session to select the at least one sub-track and the media data portion used when the media data portion is switched during the media session, wherein said providing c) comprises providing, in said media container file and for said at least one sub-track of said multiple sub-tracks, an alternate group identifier applicable in connection with setting up a media session when selecting a sub-stream to be processed during said media session wherein said providing c) comprises providing, in said media container file and for said at least one sub-track of said multiple sub-tracks, a switch group identifier applicable when switching between different streams and/or sub-streams during an ongoing media session.

2. The method according to claim 1, wherein said providing c) comprises providing, in said media container file and for said at least one sub-track of said multiple sub-tracks, sub-track information defining a selective processing of said media data portion defined by said at least one sub-track in relation to remaining media data portions defined by the remaining sub-tracks of said multiple sub-tracks.

3. The method according to claim 1, wherein said media data is scalable video coding data comprising a first media data portion constituting a base layer and at least one second media data portion constituting at least one enhancement layer and said providing b) comprises:

providing, in said media container file and for a first sub-track, sub-track information identifying said first media data portion; and providing, in said media container file and for at least one second sub-track, sub-track information identifying said at least one second media data portion.

4. The method according to claim 1, wherein said media data is multiview video coding data comprising a first video data portion constituting a first view and at least one second video data portion constituting at least one second view and said providing step b) comprises:

providing, in said media container file and for a first sub-track, sub-track information identifying said first media data portion; and providing, in said media container file and for at least one second sub-track, sub-track information identifying said at least one second media data portion.

5. The method according to claim 1, further comprising providing, in said media container file, track selection information defining a selective processing of said media data defined by said media track, said track selection information having a predefined value indicating that said media track comprises multiple sub-tracks.

6. The method according to claim 1, wherein said providing c) is performed for a first portion of said multiple sub-tracks, said method further comprising providing, in said media container file, track selection information defining a selective processing of said media data defined by said media track, said track selection information being applicable to a second remaining portion of said multiple sub-tracks.

7. The method according to claim 1, wherein said media track further comprises packetization information related to delivery of said media data.

8. A media content server intended for generating a media container file, said media content server including a processor and a memory and further comprising:

a data organizer configured to organize media data in said media container file, wherein the media container file comprises the media data to be transmitted to a client during a media session, said media data being defined by a media track in said media container file and comprises multiple media data portions defining respective sub-streams;

a sub-track information provider configured to provide, in said media container file, sub-track information identifying, for each sub-track of multiple sub-tracks defined in said media track, the media data portion of said media data that belongs to said sub-track; and a selection information provider configured to provide, in said media container file and for at least one sub-track of said multiple sub-tracks, selection information defining a selective processing of the media data portion defined by said at least one sub-track in relation to other media data organized in said media container file and relating to the same content as said media data portion defined by said at least one sub-track;

wherein the selection information is used by the selection information provider in connection with the media session to select the at least one sub-track and the media data portion used when starting the media session or the media data portion that is switched during the media session, wherein said selection information provider comprises an alternate group identifier provider configured to provide, in said media container file and for said at least one sub-track of said multiple sub-tracks, an alternate group identifier applicable in connection with setting up a media session when selecting a sub-stream to be processed during said media session, wherein said selection information provider comprises a switch group identifier provider configured to provide, in said media container file and for said at least one sub-track of said multiple sub-tracks, a switch group identifier applicable when switching between different streams and/or sub-streams during an ongoing media session.

9. The media content server according to claim 8, wherein said media data is scalable video coding data comprising a first media data portion constituting a base layer and at least one second media data portion constituting at least one enhancement layer and said sub-track information provider is configured to provide, in said media container file and for a first sub-track, sub-track information identifying said first media data portion, and provide, in said media container file and for at least one second sub-track, sub-track information identifying said at least one second media data portion.

10. The media content server according to claim 8, wherein said media data is multiview video coding data comprising a first video data portion constituting a first view and at least one second video data portion constituting at least one second view and said sub-track information provider is configured to provide, in said media container file and for a first sub-track, sub-track information identifying said first media data portion, and provide, in said media container file and for at least one second sub-track, sub-track information identifying said at least one second media data portion.

11. The media content server according to claim 8, further comprising a track selection information provider configured to provide, in said media container file, track selection information defining a selective processing of said media data defined by said media track, said information having a predefined value indicating that said media track comprises multiple sub-tracks.

12. The media content server according to claim 8, wherein said selection information provider is configured to assign respective selection information defining a selective processing for a first portion of said multiple sub-tracks, said media content server further comprising a track selection information provider configured to provide, in said media container file, track selection information defining a selective processing of said media data defined by said media track, said track selection information being applicable to a second remaining portion of said multiple sub-tracks.

13. The media content server according to claim 8, wherein said media track further comprises packetization information related to delivery of said media data.

14. A memory including a media container file, the media container file comprising:
    media data comprising multiple media data portions constituting respective sub-streams;
    a media track defining said media data;
    sub-track information identifying, for each sub-track of multiple sub-tracks defined in said media track, the media data portion of said media data that belongs to said sub-track; and
    selection information defining, for at least one sub-track of said multiple sub-tracks, a selective processing of the media data portion defined by said at least one sub-track in relation to other media data organized in said media container file and relating to the same content as said media data portion defined by said at least one sub-track;
    wherein the selection information is used by a media server in connection with a media session to select the at least one sub-track and the media data portion used when starting the media session or the media data portion that is switched during the media session,
    wherein said selection information comprises an alternate group identifier applicable in connection with setting up a media session when selecting sub-stream to be processed during said media session,
    wherein said selection information comprises a switch group identifier applicable when switching between different streams and/or sub-streams during an ongoing media session.

15. The memory including the media container file according to claim 14, wherein said media data is scalable video coding data comprising a first media data portion constituting a base layer and at least one second media data portion constituting at least one enhancement layer, and said sub-track information comprises:
    first sub-track information, for a first sub-track, identifying said first media data portion; and
    at least one second sub-track information, for at least one second sub-track, identifying said at least one second media data portion.

16. The memory including the media container file according to claim 14, wherein said media data is multiview video coding data comprising a first video data portion constituting a first view and at least one second video data portion constituting at least one second view and said sub-track information comprises:
    first sub-track information, for a first sub-track, identifying said first media data portion; and
    at least one second sub-track information, for at least one second sub-track, identifying said at least one second media data portion.

17. The memory including the media container file according to claim 14, further comprising track selection information defining a selective processing of said media data defined by said media track, said track selection information having a predefined value indicating that said media track comprises multiple sub-tracks.

18. The memory including the media container file according to claim 14, wherein a first portion of said multiple sub-tracks has respective selection information, said media container file further comprising track selection information defining a selective processing of said media data defined by said media track, said track selection information being applicable to a second remaining portion of said multiple sub-tracks.

19. The memory including the media container file according to claim 14, wherein said media track further comprises packetization information related to delivery of the media data.

20. A media processing method comprising:
    providing a media container file comprising a media track defining media data organized in said media container file, wherein the media container file comprises the media data to be transmitted to a client during a media session, said media data comprises multiple media data portions defining respective sub-streams, sub-track information identifying, for each sub-track of multiple sub-tracks defined in said media track, the media data portion of said media data that belongs to said sub-track, an alternate group identifier constituting, for at least one sub-track of said multiple sub-tracks, a stream selection criterion among streams and/or sub-streams relating to the same content, and a switch group identifier constituting, for at least one sub-track of said multiple sub-tracks, a stream switching criterion between streams and/or sub-streams relating to the same content;
    selecting, in connection with setting up the media session, a sub-track among said multiple sub-tracks based on said alternate group identifier;
    selecting, during an ongoing media session involving transmission of media data contained in said media container file to at least one user terminal, a sub-track among said multiple sub-tracks based on said switch group identifier;
    compiling data packets by extracting, based on said sub-track information associated with said selected sub-track, media data from said media container file; and
    transmitting said data packets to at least one user terminal during said media session.

21. The media processing method according to claim 20, wherein said media track further comprises packetization information related to delivery of the media data.

22. A media processing server comprising:
    a container provider configured to provide a media container file comprising a media track defining media data organized in said media container file, wherein the media container file comprises the media data to be transmitted to a client during a media session, said media data comprises multiple media data portions defining respective sub-streams, sub-track information identifying, for each sub-track of multiple sub-tracks defined in said media track, the media data portion of said media data that belongs to said sub-track, an alternate group identifier constituting, for at least one sub-track of said multiple sub-tracks, a stream selection criterion among streams and/or sub-streams relating to the same content, and a switch group identifier constituting, for at least one sub-track of said multiple sub-tracks, a stream switching criterion between streams and/or sub-streams relating to the same content;

a track selector configured to select, in connection with setting up the media session, a sub-track among said multiple sub-tracks based on said alternate group identifier and to select, during an ongoing media session involving transmission of media data contained in said media container file to at least one user terminal, a sub-track among said multiple sub-tracks based on said switch group identifier;

a packet compiler configured to compile data packets by extracting, based on said sub-track information associated with said selected sub-track, media data from said media container file; and a transmitter configured to transmit said data packets to at least one user terminal during said media session.

23. The media processing server according to claim 22, wherein said media track further comprises packetization information related to delivery of the media data.

\* \* \* \* \*

UNITED STATES PATENT AND TRADEMARK OFFICE
CERTIFICATE OF CORRECTION

PATENT NO.         : 8,768,984 B2                                            Page 1 of 1
APPLICATION NO.    : 13/258741
DATED              : July 1, 2014
INVENTOR(S)        : Priddle et al.

It is certified that error appears in the above-identified patent and that said Letters Patent is hereby corrected as shown below:

On the Title Page, Item (73), under "Assignee", in Column 1, Line 2, delete "(publ)" and insert
-- (publ), Stockholm --, therefor.

On the Title Page, Item (60), under "Related U.S. Application Data", in Column 1, Lines 1-2, delete
"Apr. 9, 4009." and insert -- Apr. 9, 2009. --, therefor.

In the Specification

In Column 5, Line 20, delete "ration" and insert -- ratio --, therefor.

In Column 16, Line 66, delete "('str')" and insert -- ('stri') --, therefor.

In Column 17, Line 65, delete "(stri)" and insert -- ('stri') --, therefor.

In the Claims

In Column 29, Line 20, in Claim 1, delete "session" and insert -- session, --, therefor.

Signed and Sealed this
Twenty-fourth Day of March, 2015

Michelle K. Lee
*Director of the United States Patent and Trademark Office*